US011233766B2

(12) United States Patent
Xiao et al.

(10) Patent No.: US 11,233,766 B2
(45) Date of Patent: Jan. 25, 2022

(54) DATA TRANSMISSION METHOD AND NETWORK DEVICE

(71) Applicant: ALIBABA GROUP HOLDING LIMITED, Grand Cayman (KY)

(72) Inventors: Han Xiao, Hangzhou (CN); Chenghao Sun, Hangzhou (CN); Jun Liang, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 0 days.

(21) Appl. No.: 16/364,064

(22) Filed: Mar. 25, 2019

(65) Prior Publication Data

US 2019/0222552 A1 Jul. 18, 2019

Related U.S. Application Data

(63) Continuation of application No. PCT/CN2017/102386, filed on Sep. 20, 2017.

(30) Foreign Application Priority Data

Sep. 27, 2016 (CN) .......................... 201610854615.X

(51) Int. Cl.
*H04L 29/12* (2006.01)
*H04L 12/46* (2006.01)
*H04L 12/66* (2006.01)

(52) U.S. Cl.
CPC ............ *H04L 61/106* (2013.01); *H04L 12/46* (2013.01); *H04L 12/4633* (2013.01);
(Continued)

(58) Field of Classification Search
CPC ... H04L 61/106; H04L 12/46; H04L 12/4633; H04L 12/4641; H04L 12/66;
(Continued)

(56) References Cited

U.S. PATENT DOCUMENTS 6,603,763 B1 8/2003 Koshino
8,194,674 B1* 6/2012 Pagel .................. H04L 61/2535
370/393
(Continued)

FOREIGN PATENT DOCUMENTS

CN 101447956 A 6/2009
CN 101567831 A 10/2009
(Continued)

OTHER PUBLICATIONS

PCT International Search Report and Written Opinion dated Dec. 11, 2017, issue din corresponding International Application No. PCT/CN2017/102386 (5 pgs.).
(Continued)

*Primary Examiner* — Philip J Chea
*Assistant Examiner* — Hassan A Khan
(74) *Attorney, Agent, or Firm* — Finnegan, Henderson, Farabow, Garrett & Dunner, LLP

(57) ABSTRACT

Embodiments of the disclosure provide a data transmission method. The method can include receiving a first packet sent by a virtual private network user, wherein the first packet carries a first destination address that does not belong to an address range that has been configured for a virtual private network where the virtual private network user is located, converting the first destination address to a second destination address, generating a second packet according to the second destination address and the first packet, and sending the second packet outside the virtual private network where the virtual private network user is located.

20 Claims, 22 Drawing Sheets

(52) U.S. Cl.
CPC .......... *H04L 12/4641* (2013.01); *H04L 12/66* (2013.01); *H04L 61/256* (2013.01); *H04L 61/2514* (2013.01); *H04L 61/2535* (2013.01); *H04L 61/2592* (2013.01)

(58) Field of Classification Search
CPC ............. H04L 61/2514; H04L 61/2535; H04L 61/256; H04L 61/2592
See application file for complete search history.

(56) References Cited

U.S. PATENT DOCUMENTS

| | | | | |
|---|---|---|---|---|
| 2003/0026260 | A1* | 2/2003 | Ogasawara | H04L 29/06 370/392 |
| 2003/0142674 | A1* | 7/2003 | Casey | H04L 45/502 370/393 |
| 2006/0182103 | A1* | 8/2006 | Martini | H04L 63/145 370/389 |
| 2014/0007218 | A1* | 1/2014 | Rao | H04L 69/326 726/13 |
| 2015/0131674 | A1* | 5/2015 | Kao | H04L 12/4641 370/420 |

FOREIGN PATENT DOCUMENTS

| | | |
|---|---|---|
| CN | 101729388 A | 6/2010 |
| CN | 103581348 A | 2/2014 |
| CN | 104639363 A | 5/2015 |
| CN | 105122231 A | 12/2015 |
| CN | 105491082 A | 4/2016 |
| WO | WO 2018/059284 A1 | 4/2018 |

OTHER PUBLICATIONS

First Chinese Office Action issued in related Chinese Application No. 201610854615.X, dated Jun. 18, 2020 (10 pgs.).
First Chinese Search Report issued in related Chinese Application No. 201610854615.X, dated Jun. 18, 2020 (2 pgs.).

* cited by examiner

DATA TRANSMISSION METHOD AND NETWORK DEVICE

CROSS-REFERENCE TO RELATED APPLICATION

This application claims the benefits of priority to International Application No. PCT/CN2017/102386, filed on Sep. 20, 2017, which claims priority to Chinese Patent Application No. 201610854615.X, filed on Sep. 27, 2016, both of which are incorporated herein by reference in their entireties.

TECHNICAL FIELD

The present disclosure generally relates to the field of communications, and in particular, to a data transmission method and a network device.

BACKGROUND

In a virtual private cloud (VPC) network, an address of each user in the network can be customized in a range according to specifications. An address space in the VPC is freely planned by the user, and address resources are freely controlled by the user. Therefore, a cloud service provider avoids invading the address space of the user in the VPC by occupying network addresses in the VPC. As such, the cloud service provider cannot set a unified IP address inside the VPC network to provide users with a certain service, especially basic services such as Network Time Protocol (NTP).

Current, to provide the basic services, a service provider may generally require a user to acquire various basic services by accessing a designated public network address. The problems of the solution include: the user needs to purchase a public network address and bear various costs of public network traffic.

SUMMARY

The embodiments of the present disclosure can provide a data transmission method and a network device.

Some embodiments of the present disclosure can provide a data transmission method. The method can include receiving a first packet sent by a virtual private network user, wherein the first packet carries a first destination address that is considered a designated address that does not belong to an address range that has been configured for a virtual private network where the virtual private network user is located, converting the first destination address a second destination address, generating a second packet according to the second destination address and the first packet, and sending the second packet to outside the virtual private network where the virtual private network user is located.

In some embodiments, converting the first destination address to obtain a second destination address includes: parsing the first packet to obtain an internal destination address and a virtual network identifier, determining the first destination address according to the internal destination address, and determining, according to the virtual network identifier, network identifier information of the virtual private network where the virtual private network user is located, searching a pre-configured address mapping table for a destination address to which the first destination address and the network identifier information correspond jointly, and in response to the destination address to which the first destination address and the network identifier information correspond jointly being found, determining the found destination address as the second destination address.

In some embodiments, generating a second packet according to the second destination address and the first packet includes: in response to a determination that the first packet abides by a first format, converting the first format into a second format, and encapsulating packet information carried by the first packet and the second destination address according to the second format in the second packet.

In some embodiments, in response to a determination that the first packet abides by a first format, converting the first format into the second format includes: replacing first header information abiding by the first format in the first packet with second header information abiding by the second format, wherein the first header information includes at least one of an internal source address, an internal destination address, a virtual network identifier, an external source address, or an external destination address, and the second header information includes at least one of a source address or a destination address, and encapsulating packet information carried by the first packet and the second destination address according to the second format in the second packet includes: encapsulating the second header information and the packet information in the second packet, wherein the source address carried in the second header information is an address of the network device, and the carried destination address is the second destination address.

In some embodiments, sending the second packet to the exterior of the virtual private network where the virtual private network user is located includes: determining a next-hop device according to the second destination address and a routing table, wherein the next-hop device is located outside the virtual private network where the virtual private network user is located, and sending the second packet to the next-hop device.

In some embodiments, the designated address does not belong to an address range that has been configured for a designated network.

In some embodiments, the designated address belongs to an address range from 100.64.0.0 to 100.64.0.10.

In some embodiments, the virtual private network is a Virtual Private Cloud (VPC) network.

In some embodiments, the first format is a Virtual Extensible Local Area Network (VXLAN) format, and the second format is a Virtual Local Area Network (VLAN) format.

In some embodiments, the first destination address and the second destination address correspond to a server.

In some embodiments, the server is one of an NTP server or an encryption server.

Some embodiments of the present disclosure further provide a data transmission method. The method can include receiving a first packet sent by a user in a first-class network, wherein the first packet carries a first destination address that is considered a designated address in a second-class network, and the designated address neither belongs to an address range that has been configured for the first-class network nor belongs to an address range that has been configured for a third-class network, converting the first destination address to a second destination address, generating a second packet according to the second destination address and the first packet, and sending the second packet to the second-class network.

Some embodiments of the present disclosure further provide a data transmission method. The method can include receiving a first packet sent by a network device, wherein the first packet carries the first source address, converting the first source address to a second source address, wherein the second source address is considered a designated address that does not belong to an address range that has been configured for a virtual private network where a virtual private network user is located, generating a second packet according to the second source address and the first packet, and sending the second packet to the interior of the virtual private network where the virtual private network user is located.

In some embodiments, converting the first source address to a second source address includes: parsing the first packet to obtain the first source address, searching a pre-configured address mapping table for a source address to which the first source address corresponds, and in response to a source address to which the first source address corresponds being found, setting the found source address as the second source address.

In some embodiments, generating a second packet according to the second source address and the first packet includes: in response to a determination that the first packet abides by a first format, converting the first format into the second format, and encapsulating packet information carried by the first packet and the second source address according to the second format in the second packet.

In some embodiments, in response to a determination that the first packet abides by a first format, converting the first format into the second format includes: replacing first header information abiding by the first format in the first packet with second header information abiding by the second format, wherein the first header information includes at least a source address and a destination address, and the second header information includes at least an internal source address, an internal destination address, a virtual network identifier, an external source address, and an external destination address, and encapsulating packet information carried by the first packet and the second destination address according to the second format to obtain the second packet includes: encapsulating the second header information and the packet information in the second packet, wherein the source address carried in the second header information is an address of the network device, and the carried destination address is the second destination address.

In some embodiments, the designated address does not belong to an address range that has been configured for a designated network.

In some embodiments, the designated address belongs to an address range from 100.64.0.0 to 100.64.0.10.

In some embodiments, the virtual private network is a Virtual Private Cloud (VPC) network.

In some embodiments, the first format is a Virtual Local Area Network (VLAN) format, and the second format is a Virtual Extensible Local Area Network (VXLAN) format.

In some embodiments, the first source address and the second source address correspond to a server.

In some embodiments, the server is one of an NTP server or an encryption server.

Some embodiments of the present disclosure further provide a data transmission method, including receiving a first packet sent by a device in a second-class network, wherein the first packet carries a first source address, converting the first destination address to a second source address, wherein the second source address is considered a designated address in the second-class network, and the designated address does not belong to an address range that has been configured for a virtual private network where a virtual private network user is located, generating a second packet according to the second destination address and the first packet, and sending the second packet to the interior of the virtual private network where the virtual private network user is located.

Some embodiments of the present disclosure further provide a network device, including a receiving unit configured to receive a first packet sent by a virtual private network user, wherein the first packet carries a first destination address that is considered a designated address that does not belong to an address range that has been configured for a virtual private network where the virtual private network user is located, a converting unit configured to convert the first destination address to obtain a second destination address, a generating unit configured to generate a second packet according to the second destination address and the first packet, and a sending unit configured to send the second packet to the exterior of the virtual private network where the virtual private network user is located.

Some embodiments of the present disclosure further provide a network device, including a receiving unit configured to receive a first packet sent by a user in a first-class network, wherein the first packet carries a first destination address that is considered a designated address in a second-class network, and the designated address neither belongs to an address range that has been configured for the first-class network nor belongs to an address range that has been configured for a third-class network, a converting unit configured to convert the first destination address to obtain a second destination address, a generating unit configured to generate a second packet according to the second destination address and the first packet, and a sending unit configured to send the second packet to the second-class network.

Some embodiments of the present disclosure further provide a network device, including a receiving unit configured to receive a first packet sent by a network device, wherein the first packet carries a first source address, a converting unit configured to convert the first source address to a second source address, wherein the second source address is considered a designated address, and the designated address does not belong to an address range that has been configured for a virtual private network where a virtual private network user is located, a generating unit configured to generate a second packet according to the second source address and the first packet, and a sending unit configured to send the second packet to the interior of the virtual private network where the virtual private network user is located.

Some embodiments of the present disclosure further provide a network device, including a receiving unit configured to receive a first packet sent by a device in a second-class network, wherein the first packet carries a first source address, a converting unit configured to convert the first destination address to a second source address, wherein the second source address is considered a designated address in the second-class network, and the designated address does not belong to an address range that has been configured for a virtual private network where a virtual private network user is located, a generating unit configured to generate a second packet according to the second destination address and the first packet, and a sending unit configured to send the second packet to the interior of the virtual private network where the virtual private network user is located.

BRIEF DESCRIPTION OF THE DRAWINGS

The accompanying drawings described herein are used to provide further understanding of the present disclosure and constitute a part of the present disclosure. Exemplary embodiments of the present disclosure and descriptions of the exemplary embodiments are used to explain the present

DETAILED DESCRIPTION

In order to facilitate understanding of the solutions in the present disclosure, the technical solutions in some of the embodiments of the present disclosure will be described with reference to the accompanying drawings. It is appreciated that the described embodiments are merely a part of rather than all the embodiments of the present disclosure. Consistent with the present disclosure, other embodiments can be obtained without departing from the principles disclosed herein. Such embodiments shall also fall within the protection scope of the present disclosure.

It is appreciated that terms "first," "second," and so on used in the specification, claims, and the drawings of the present disclosure are used to distinguish similar objects. These terms do not necessarily describe a particular order or sequence. The objects described using these terms can be interchanged in appropriate circumstances. That is, the procedures described in the exemplary embodiments of the present disclosure could be implemented in an order other than those shown or described herein. In addition, terms such as "comprise," "include," and "have" as well as their variations are intended to cover non-exclusive inclusion. For example, a process, method, system, product, or device including a series of steps or units are not necessarily limited to the steps or units clearly listed. In some embodiments, they may include other steps or units that are not clearly listed or inherent to the process, method, product, or device.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

The data transmission method and the network device provided in the embodiments of the present disclosure enable a user in a virtual private network to obtain various services provided by corresponding servers only by using a private network that can provide a business service, such that the user in the virtual private network does not need to access networks other than the private network to obtain services. Accordingly, the amount of data traffic is reduced for the user.

Some embodiments of the disclosure can be applied to a system architecture constructed by various types of networks. In the system architecture, network addresses in the networks of various types can be set separately. Each type of networks can be linked by using an address converting device.

Figure 1:
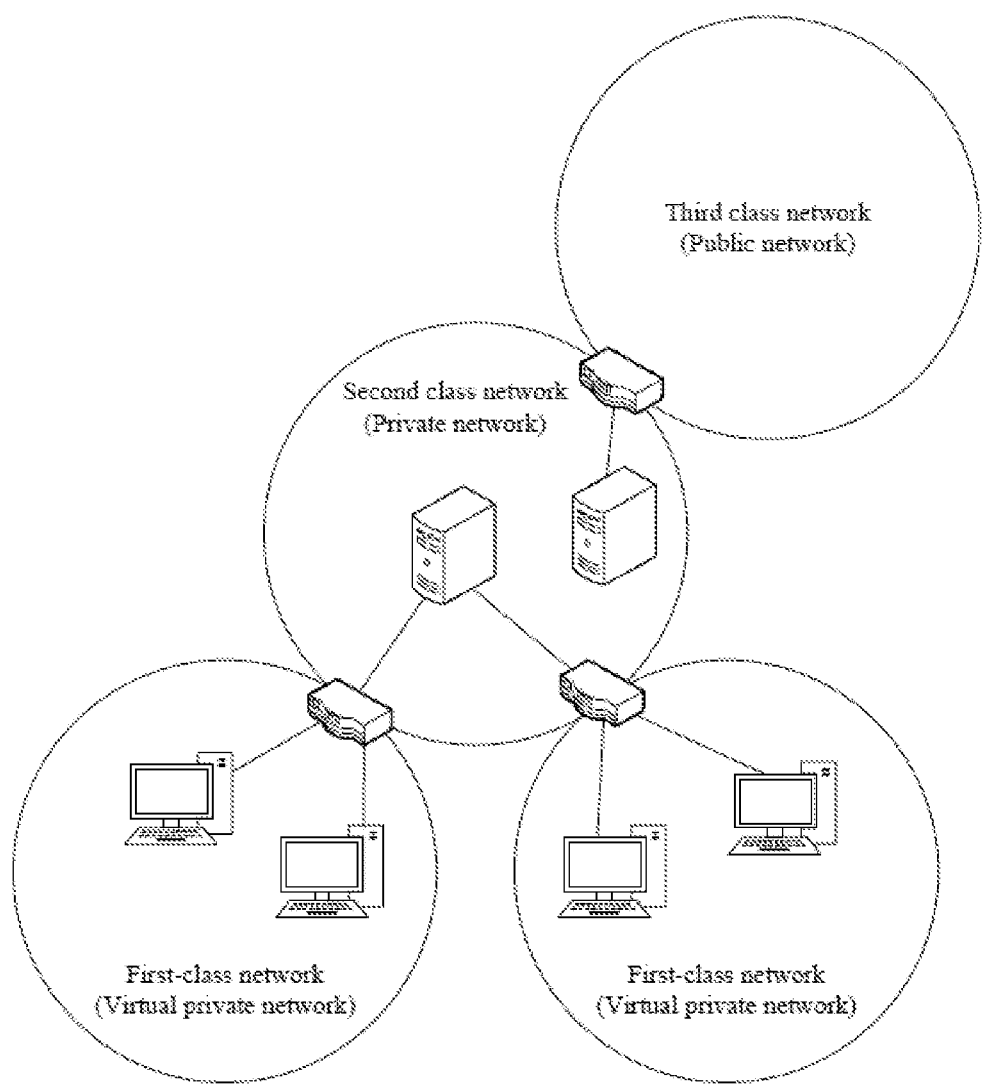
FIG. 1 is a schematic diagram of an exemplary network architecture according to some embodiments of the present disclosure.
Figure 2:
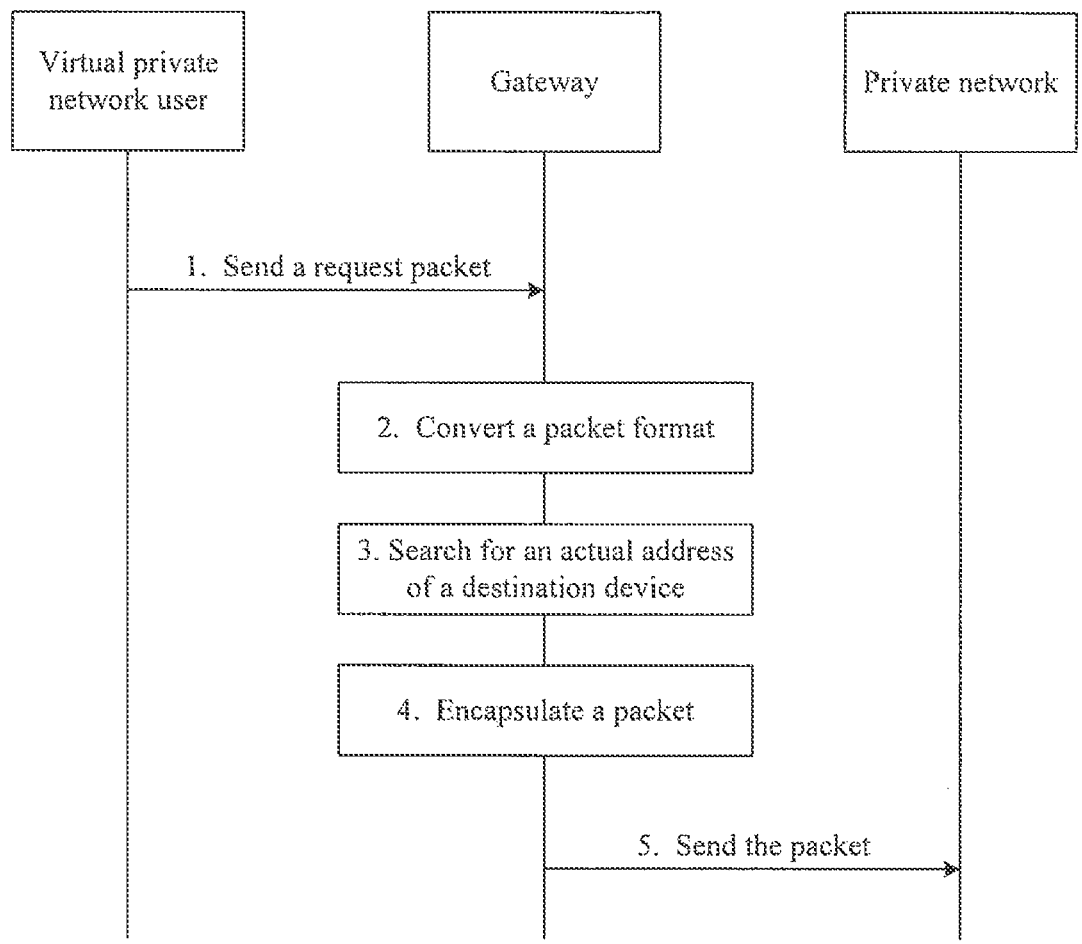
FIG. 2 is a diagram of an exemplary data transmission procedure according to some embodiments of the present disclosure.

An exemplary system architecture built by three types of networks including a virtual private network (such as a VPC, i.e. Virtual Private Cloud), a private network (which, for example, can be categorized as a local area network and a wide area network according to coverage, and can be categorized as a data center, a server cluster, an enterprise intranet, and the like according to actual building scenarios), and a public network (such as the Internet) is as shown in FIG. 1. Various types of networks communicate with each other through gateways, and each gateway is generally provided with an address conversion function, a routing forward function, and other functions. An exemplary data transmission system using the exemplary system architecture shown in FIG. 1 can be shown in FIG. 2. The data transmission procedure includes the following steps.

In step 1, a user in a virtual private network initiates an initial request packet and sends the request packet to a gateway of the virtual private network. It is appreciated that according to actual network configuration requirements, the virtual private network can further provide the user with a forwarding device configured for packet forwarding, encapsulation, decapsulation, and other functions, such as a Virtual Extensible Local Area Network (VXLAN) Tunneling End Point (VTEP). The forwarding device is an agent for communication between the user and the exterior of the virtual private network.

In step 2, If the virtual private network connected to the gateway and the foregoing private network use different packet formats, the gateway needs to convert the format of the received request packet to adapt to a transmission format in the private network.

In step 3, when converting the format, the gateway further needs to search for an actual address of a destination device in the private network according to the destination address in the request packet.

In step 4, the gateway encapsulates the actual address and request contents of the request packet in a packet according to a transmission format suitable for the private network.

In step 5, the gateway forwards the encapsulated packet according to a path planned in routing.

After receiving the request packet, the destination device in the private network can process the request content and return the processing result to the user. The returning procedure is an inverse process of the foregoing steps 1 to 5.

Figure 3:
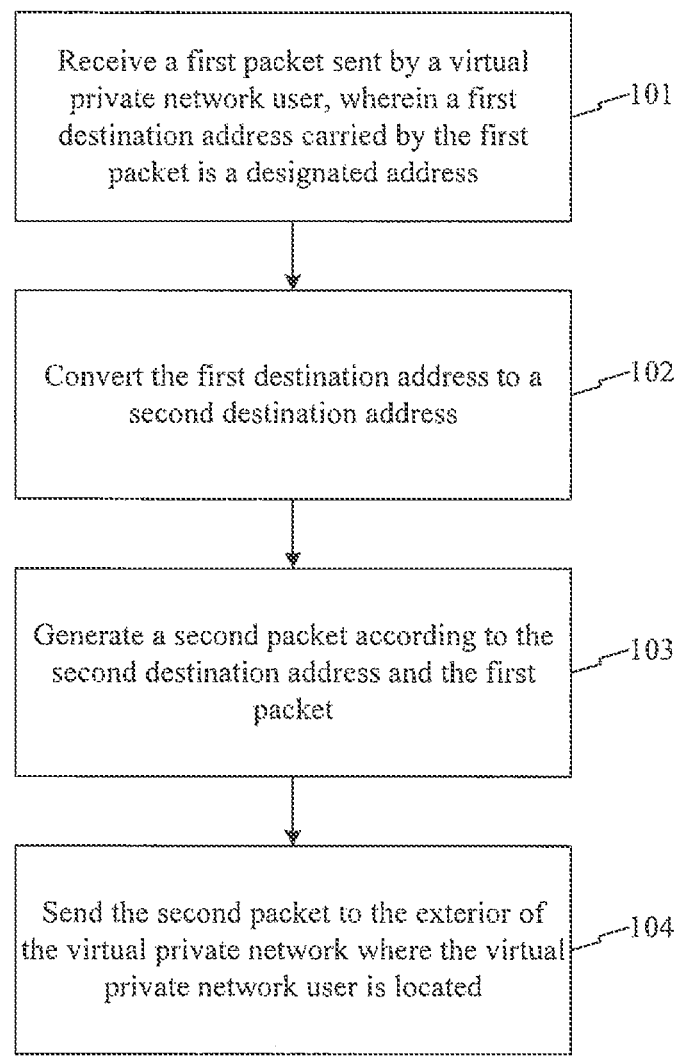
FIG. 3 is a flowchart of an exemplary data transmission method according to some embodiments of the present disclosure.

The embodiments of the present disclosure provide an exemplary data transmission method by a network device between a virtual private network and a private network, as shown in FIG. 3. The network device can be a gateway, a Server Load Balancing (SLB), and the like. The method can include the following steps.

In step 101, a first packet sent by a virtual private network user is received, wherein a first destination address carried by the first packet is a designated address. The first destination address is a server address configured for the user in the virtual private network according to actual implementation and is generally different from an actual network address of a server in the private network.

The designated address does not belong to an address range that has been configured for the virtual private network where the virtual private network user is located. The designated address can be a network address in the foregoing private network. The designated address can be configured as a server (such as an NTP server or an encryption server) address that provides a corresponding basic service (such as an NTP service and an encryption service), such that the user does not need to purchase addresses in other networks including the public network and bear costs of various types of network traffic. If a business network is also connected to other private networks and can communicate with this private network, it should be avoided that traffic accessing the foregoing various types of basic services flows to the other private networks. Therefore, it can also be required that the designated address does not belong to an address range that has been configured for certain one or more designated networks of the other private networks.

In some embodiments, the first packet can be a request packet for acquiring a basic service. The destination address carried in the packet is not within the address range in the virtual private network. Therefore, the packet will flow through the gateway to a network outside the private network (in the exemplary architecture shown in FIG. 1, the first packet will flow from the virtual private network to the private network).

In step 102, the first destination address is converted to a second destination address. The second destination address corresponds to the first destination address and is used to indicate an actual network address of the server in the private network. Therefore, the second destination address and the first destination address correspond to a server.

In step 103, a second packet is generated according to the second destination address and the first packet. The destination address is changed, therefore format conversion and re-capsulation can be performed on the contents of the first packet to generate the second packet.

In step 104, the second packet is sent outside the virtual private network where the virtual private network user is located. The data transmission method provided in the embodiment of the present disclosure enables a user in a virtual private network to acquire various services provided by corresponding servers only by using a private network that can provide a business service, such that the user in the virtual private network does not need to acquire services by accessing networks other than the private network. Therefore, the traffic is reduced for the user.

Figure 4:
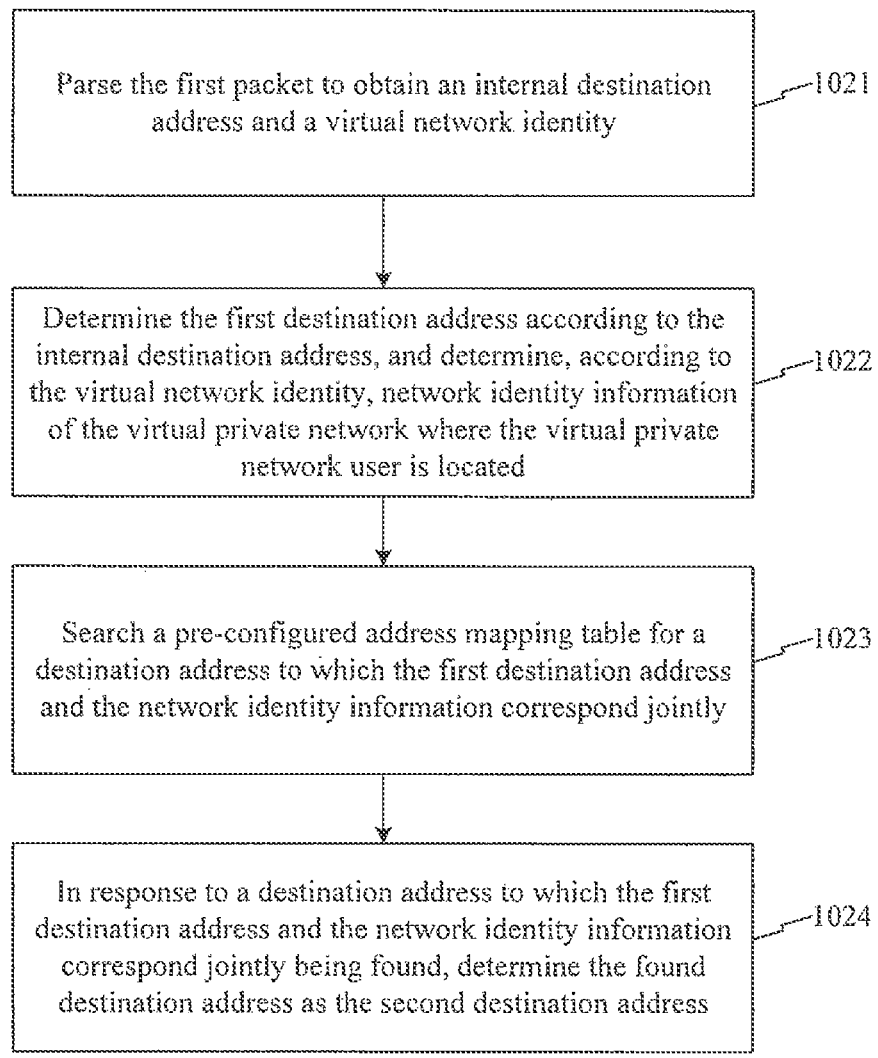
FIG. 4 is a flowchart of another exemplary data transmission method according to some embodiments of the present disclosure.

According to the embodiments of the present disclosure, the designated address is set separately. Therefore, an address mapping table can be configured in the network device to store an association between the designated address and an actual address of a server pointed by the designated address in the private network. Converting the first destination address to the second destination address, which includes the configuration of the address mapping table, is provided according to the embodiments of the present disclosure, as shown in FIG. 4. The method can include the following steps.

In step 1021, the first packet is parsed to obtain an internal destination address and a virtual network identifier. The virtual network identifier is identifier information of the virtual private network where the user is located and is used for distinguishing different virtual private networks.

In step 1022, the first destination address is determined according to the internal destination address, and network identifier information of the virtual private network where the virtual private network user is located is determined according to the virtual network identifier.

In step 1023, a pre-configured address mapping table is searched for a destination address to which the first destination address and the network identifier information correspond jointly. Not all users have the right to use basic services. Therefore, the virtual network identifier is introduced in the process of searching for the destination address to distinguish different types of users.

In step 1024, When a destination address to which the first destination address and the network identifier information correspond jointly is found, the found destination address is determined as the second destination address.

At present, IPv4 address ranges commonly used in the private network include 10.0.0.0 to 10.255.255.255, 172.16.0.0 to 172.31.255.255, and 192.168.0.0 to 192.168.255.255. Therefore, the second destination address mentioned here can be selected from the above three sections. Based on the current distribution of the IPv4 address range, the designated address can be selected from the address range from 100.64.0.0 to 100.64.0.10. The address range is usually used in the private network, and usually are not configured for a network other than the private network. In one example, the first destination address (i.e., the designated address) and the second destination address can be configured as 100.64.10.10 and 10.10.10.101, respectively. As such, the first destination address 100.64.10.10 and virtual network identifier VNI can be mapped to the second destination address 10.10.10.101. The mapping relationship can be added to the address mapping table.

Figure 5:
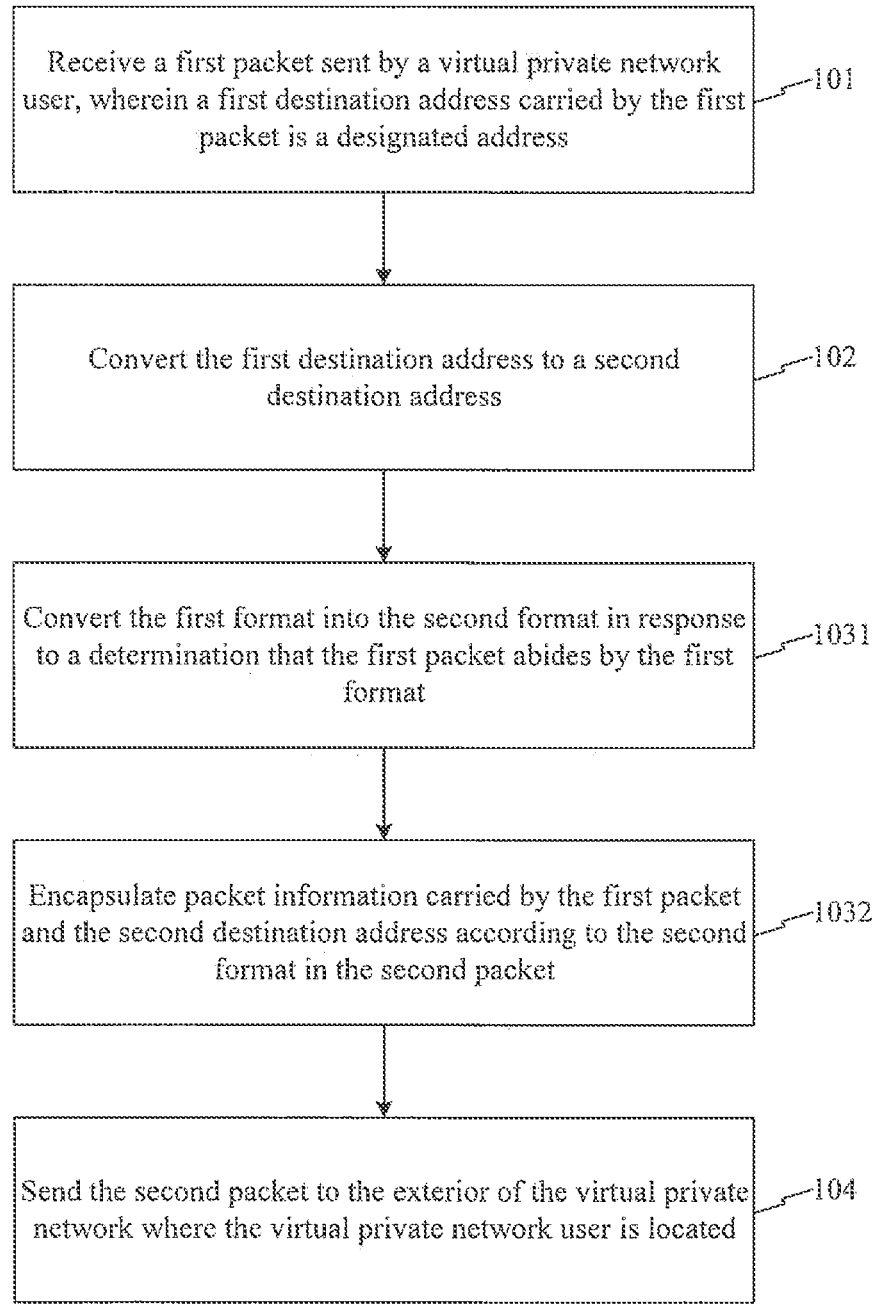
FIG. 5 is a flowchart of another exemplary data transmission method according to some embodiments of the present disclosure.

Different types of networks may be configured based on different communication protocols. The first packet and the second packet that are mentioned in the foregoing may have different packet formats. An exemplary data transmission method according to some embodiments of the present disclosure, as an exemplary implementation of the step 103, is shown in FIG. 5. The method can include the following steps.

In step 1031, a first format is converted to the second format if the first packet abides by the first format.

In step 1032, packet information carried by the first packet and the second destination address are encapsulated according to the second format in the second packet.

The first format described here refers to a packet format supported by the virtual private network where the user is located, and the second format refers to a packet format supported by the private network. For example, when the virtual private network is a VPC, the corresponding first format may abide by a Virtual Extensible Local Area Network (VXLAN) format. When the private network is a virtual local area network, the corresponding second format may abide by a Virtual LAN (VLAN) format. When different network types have different packet formats, a corresponding format converting method can be configured.

An example of main contents of a VXLAN packet format is shown in the following Table 1.

TABLE 1

| External source IP | External destination IP | Virtual network identifier | Internal source IP | External source IP | Packet information |
|---|---|---|---|---|---|
| 10.10.10.11 | 10.10.10.100 | 1111111 | 192.168.1.100 | 100.64.10.10 | abc |

An example of main contents of the VLAN packet format is shown in the following Table 2.

TABLE 2

| Source address | Destination address | Packet information |
|---|---|---|
| 10.10.10.11 | 10.10.10.101 | abc |

The contents shown above are part of the contents in the corresponding packet. Other necessary information such as a MAC address can further be set according to actual transmission requirements.

Figure 6:
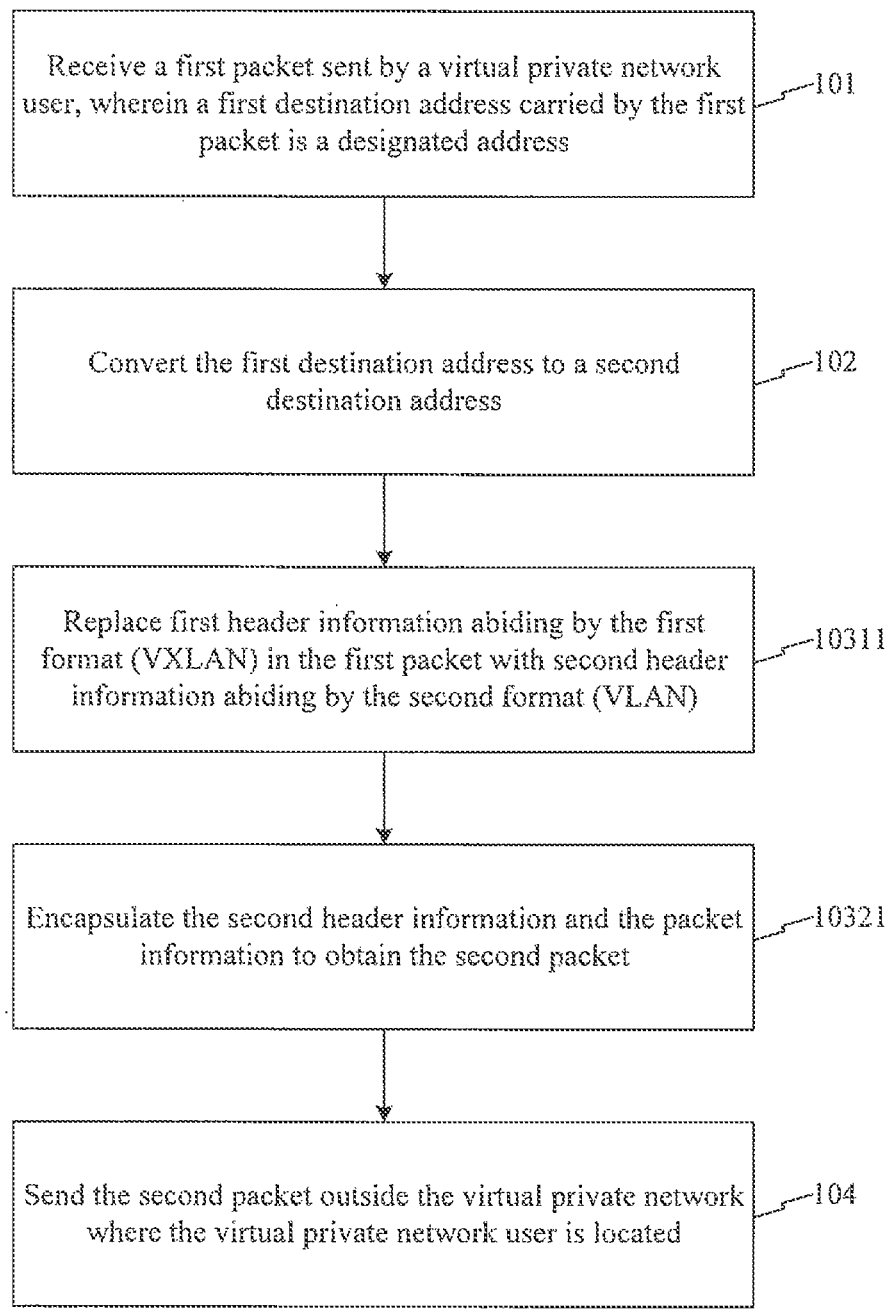
FIG. 6 is a flowchart of another exemplary data transmission method according to some embodiments of the present disclosure.

FIG. 6 is a flowchart of another exemplary data transmission method according to some embodiments of the present disclosure. By taking the foregoing VXLAN and VLAN packet formats as an example, the method can include the foregoing steps 1031 and 1032, as shown in FIG. 6.

In step 10311, first header information abiding by the first format (VXLAN) in the first packet is replaced with second header information abiding by the second format (VLAN). The first header information can contain an internal source address, an internal destination address, a virtual network identifier, an external source address, and an external destination address. The second header information can include a source address and a destination address. Therefore, in the process of format conversion, the internal source IP carried in the VXLAN packet can be the source IP of the VLAN packet, and the internal destination IP carried in the VXLAN packet can be the destination IP of the VLAN packet. Other IP addresses and the virtual network identifier in the VXLAN packet are not kept unchanged in the process of format conversion.

In step 10321, the second header information and the packet information are encapsulated to obtain the second packet.

When encapsulation is performed according to the second format, as the source IP and the destination IP that are carried in the VLAN packet obtained via format conversion are merely addresses configured for the user inside the virtual private network to use, it is necessary to convert the destination address carried in the second header information into the second destination address, such that the packet can be transmitted to a correct target device. The carried source address is the address of the network device, such that a feedback packet can be received correctly by the network device.

Figure 7:
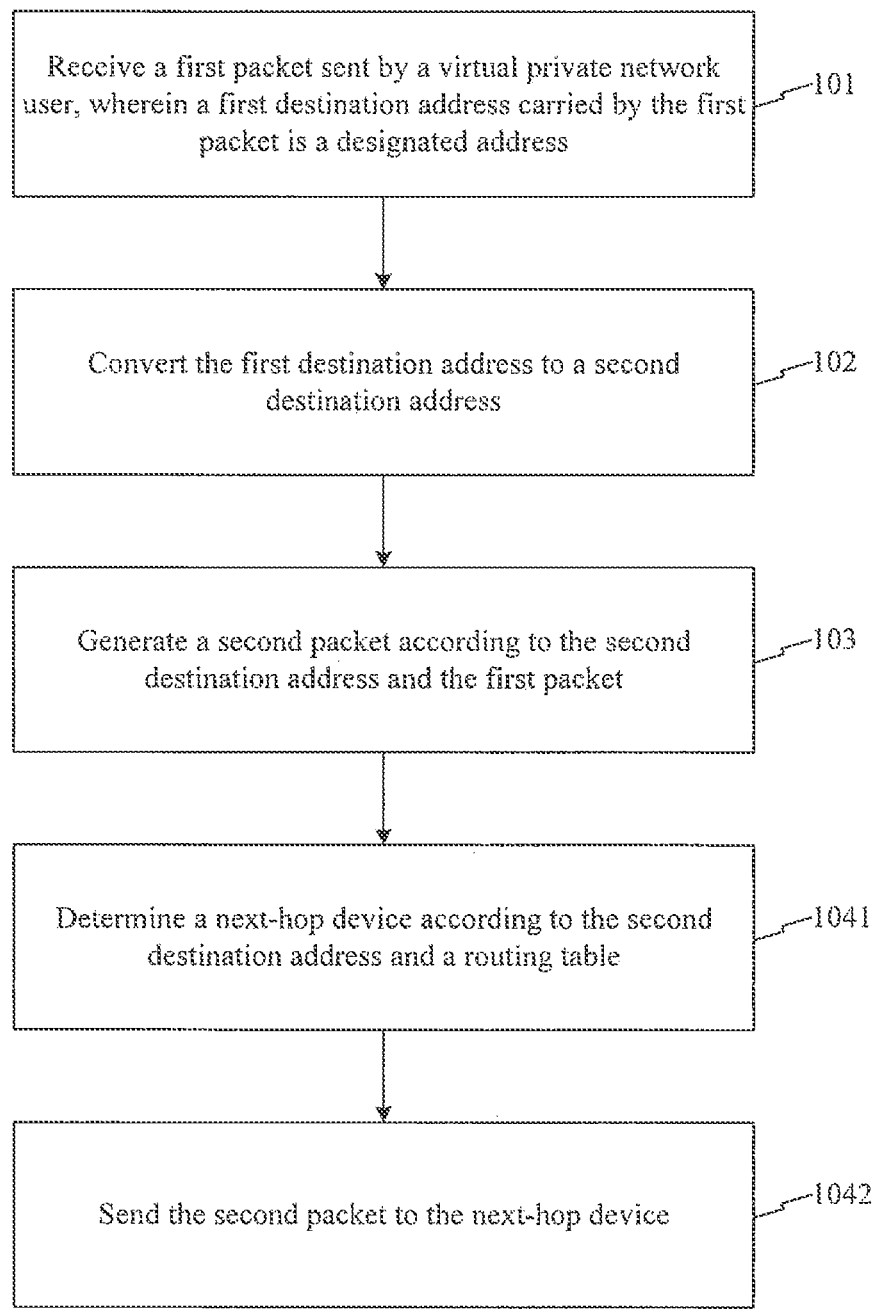
FIG. 7 is a flowchart of another exemplary data transmission method according to some embodiments of the present disclosure.

In addition, in order to implement correct and quick forwarding of the second packet, a routing table related to the second destination address needs to be configured in advance on the gateway between the virtual private network and the private network, such that when a packet sent to the second destination address is received, the packet can be forwarded directly. An exemplary method which can include an exemplary implementation of the foregoing step 104 is shown in FIG. 7. The method can include the following steps.

In step 1041, a next-hop device is determined according to the second destination address and a routing table. The second destination address is a server address in the private network, and therefore, the next-hop device is located outside the virtual private network where the virtual private network user is located. The routing table mentioned here generally needs to be pre-configured or is configured by the gateway through self-leaning.

In step 1042, the second packet is sent to the next-hop device. Steps of traffic flowing from the user side in the virtual private network to the private network side are illustrated above, and steps of traffic flowing from the private network side to the user side in the virtual private network will be described below.

Figure 8:
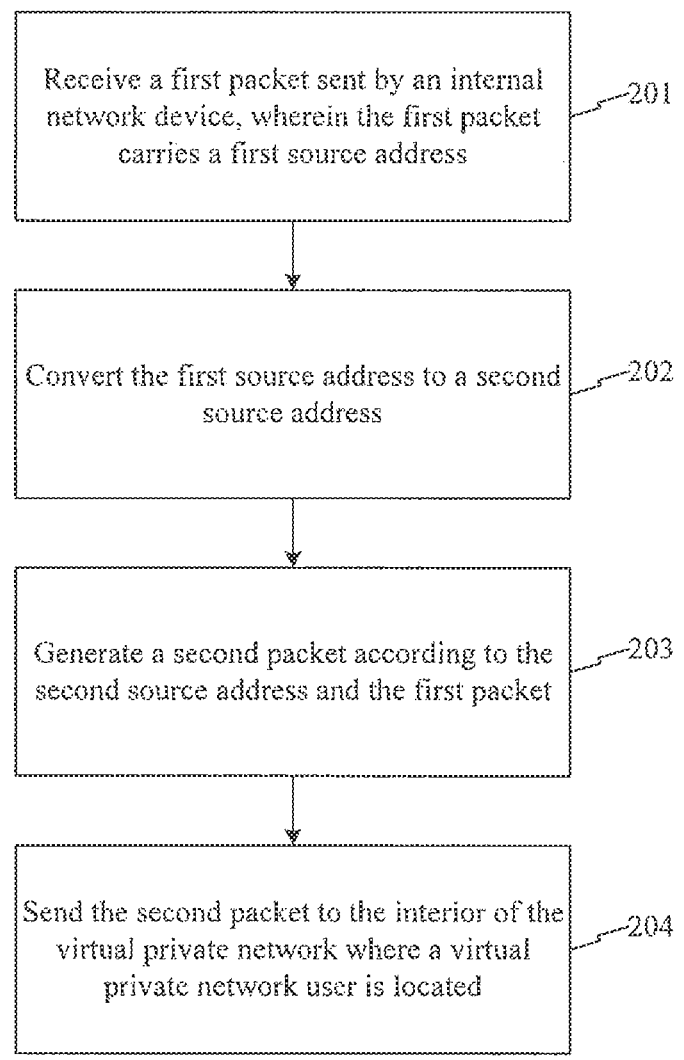
FIG. 8 is a flowchart of another exemplary data transmission method according to some embodiments of the present disclosure.

FIG. 8 is a flowchart of another exemplary data transmission method according to some embodiments of the present disclosure. The method includes the following steps.

In step 201, a first packet sent by a network device in a private network is received, wherein the first packet carries a first source address.

In step 202, the first source address is converted to a second source address.

In step 203, a second packet is generated according to the second source address and the first packet.

In step 204, the second packet is sent to the virtual private network where the virtual private network user is located.

Step 201 to step 204 can be an inverse procedure of step 101 to step 104. For example, step 101 to step 104 illustrate that the user requests a basic service from a private network server, and step 201 to step 204 illustrate that the server replies to the user request.

Therefore, the first source address and the second destination address are actually the same, both of which are used to represent the actual network address of the server in the private network. The second source address and the first destination address (i.e., the designated address) are the same, both of which are used to represent the server address provided for the user inside the virtual private network.

Moreover, in the current exemplary method, the first packet and the second packet described here are both packets delivered to the user side by the server side and are different from the first packet and the second packet that are described in the foregoing.

Figure 9:
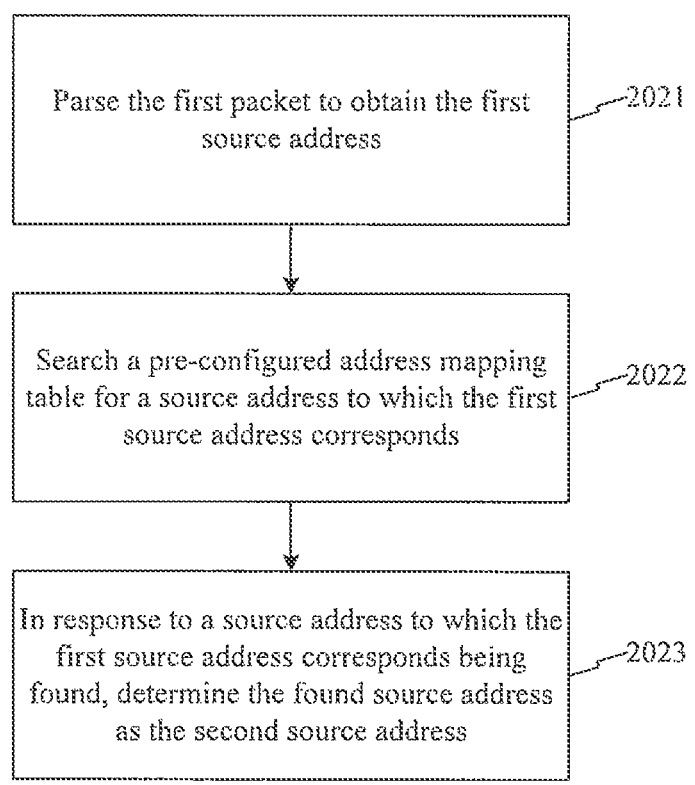
FIG. 9 is a flowchart of another exemplary data transmission method according to some embodiments of the present disclosure.

FIG. 9 is a flowchart of another exemplary data transmission method according to some embodiments of the present disclosure. In some embodiments of the present disclosure, the designated address is set separately. Therefore, an address mapping table can be configured in the network device, so as to store an association between the designated address and an actual address of a server pointed by the designated address in the private network. Converting the first destination address to the second destination address, which includes the configuration of the address mapping table, is shown in FIG. 9 The method can include the following steps.

In step 2021 the first packet is parsed to obtain the first source address.

In step 2022, a pre-configured address mapping table is searched for a source address to which the first source address corresponds.

In step 2023, when a source address to which the first source address corresponds is found, the found source address is determined as the second source address.

Step 2021 to step 2023 are inverse to steps 1021 to 1024.

Figure 10:
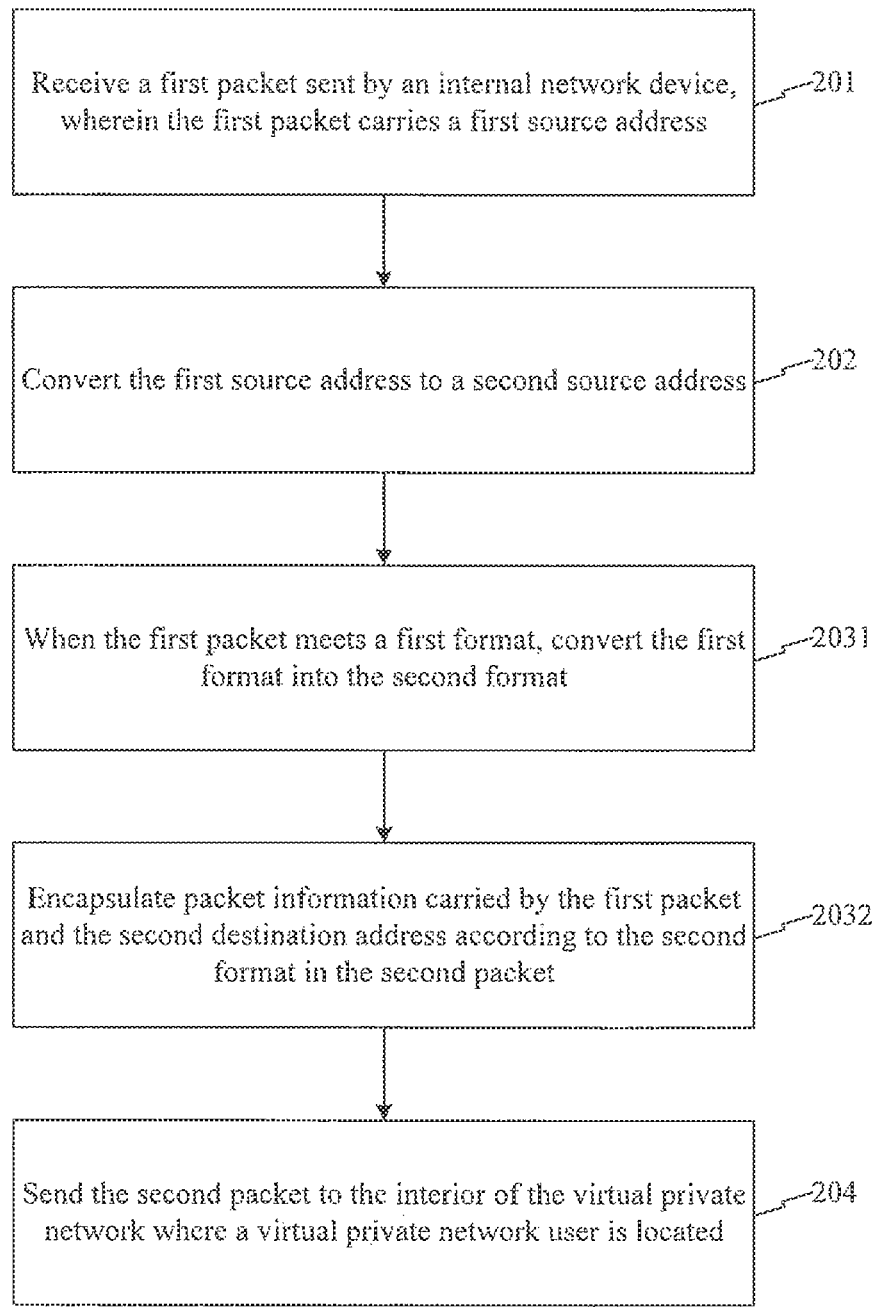
FIG. 10 is a flowchart of another exemplary data transmission method according to some embodiments of the present disclosure.

FIG. 10 is a flowchart of another exemplary data transmission method according to some embodiments of the present disclosure. Different types of networks may be configured based on different communication protocols, and therefore, the first packet and the second packet that are mentioned in the foregoing may have different packet formats. The exemplary method, which includes an exemplary implementation of the foregoing step 203, is shown in FIG. 10. The method can include the following steps.

In 2031, a first format is converted into the second format when the first packet abides by the first format.

In step 2032, packet information carried by the first packet and the second destination address are encapsulated according to the second format in the second packet.

The first format described here refers to a packet format supported by the private network, and the second format refers to a packet format supported by the virtual private network where the user is located. For example, when the private network is a virtual local area network, the corresponding first format generally should abide by the VLAN format. When the virtual private network is a VPC, the corresponding second format generally should abide by the VXLAN format.

Figure 11:
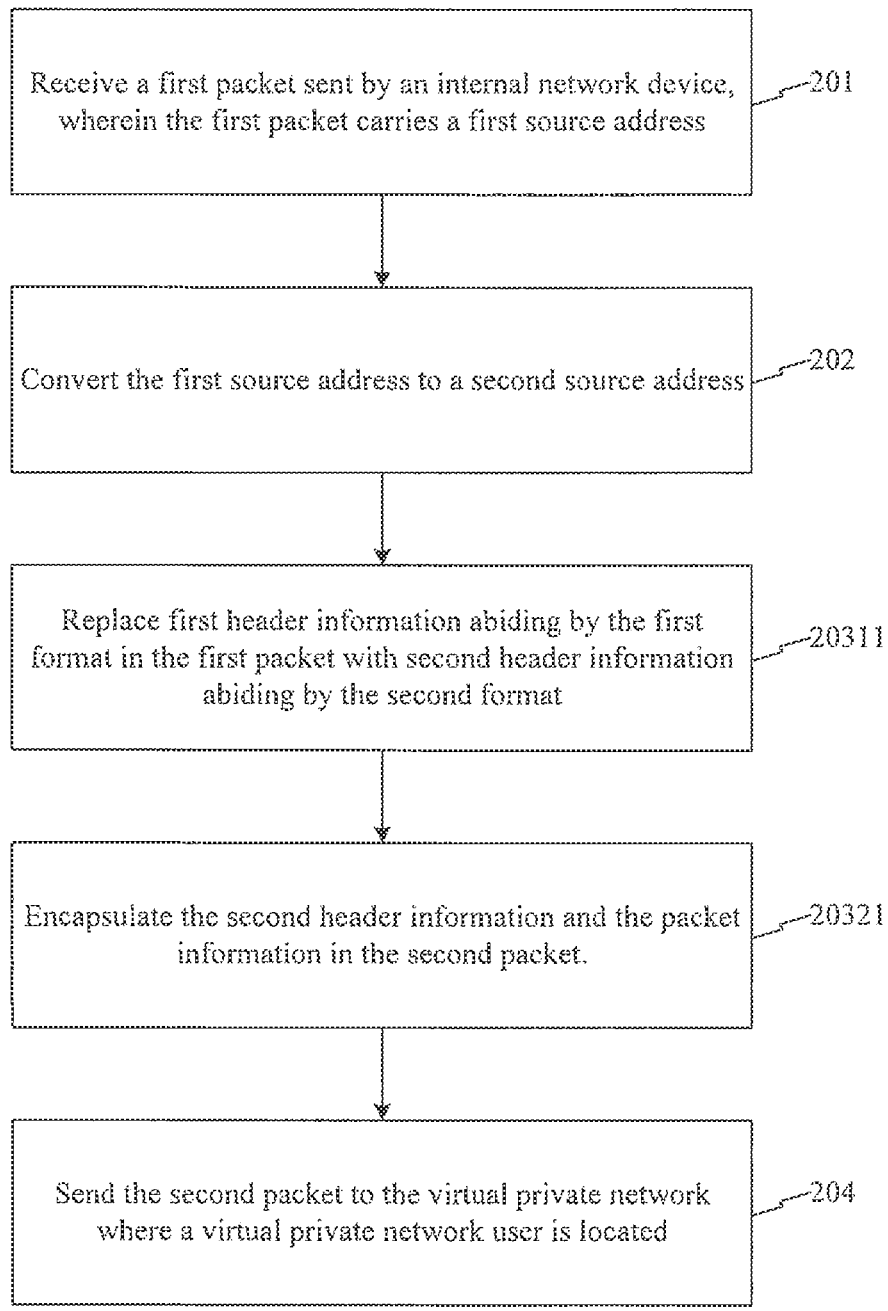
FIG. 11 is a flowchart of another exemplary data transmission method according to some embodiments of the present disclosure.

In the example of employing VXLAN and VLAN packet formats, with reference to the foregoing Table 1 and Table 2, an exemplary method, which include an exemplary implementation of steps 2031 and 2032, is shown in FIG. 11. The method can include the following steps.

In step 20311, first header information abiding by the first format in the first packet is replaced with second header information abiding by the second format. The first header information includes at least a source address and a destination address, and the second header information includes at least an internal source address, an internal destination address, a virtual network identifier, an external source address, and an external destination address.

In step 20321, the second header information and the packet information are encapsulated in the second packet. The source address carried in the second header information is an address of the network device, and the carried destination address is the second destination address.

The procedure implemented by steps 20311 and 20321 can be an inverse process of steps 10311 and 10321, that is, the packet is converted from the VLAN format to the VXLAN format and then encapsulated.

The steps of traffic flowing from the private network side to the user side in the virtual private network are described in the foregoing, and the implementation procedure can be an inverse process corresponding to the steps of traffic flowing from the user side in the virtual private network to the private network side.

The implementation process of a relevant method of traffic flowing from the private network side to the user side in the virtual private network and the implementation process of a method of traffic flowing from the user side in the virtual private network to the private network side are illustrated below with reference to examples.

Figure 12:
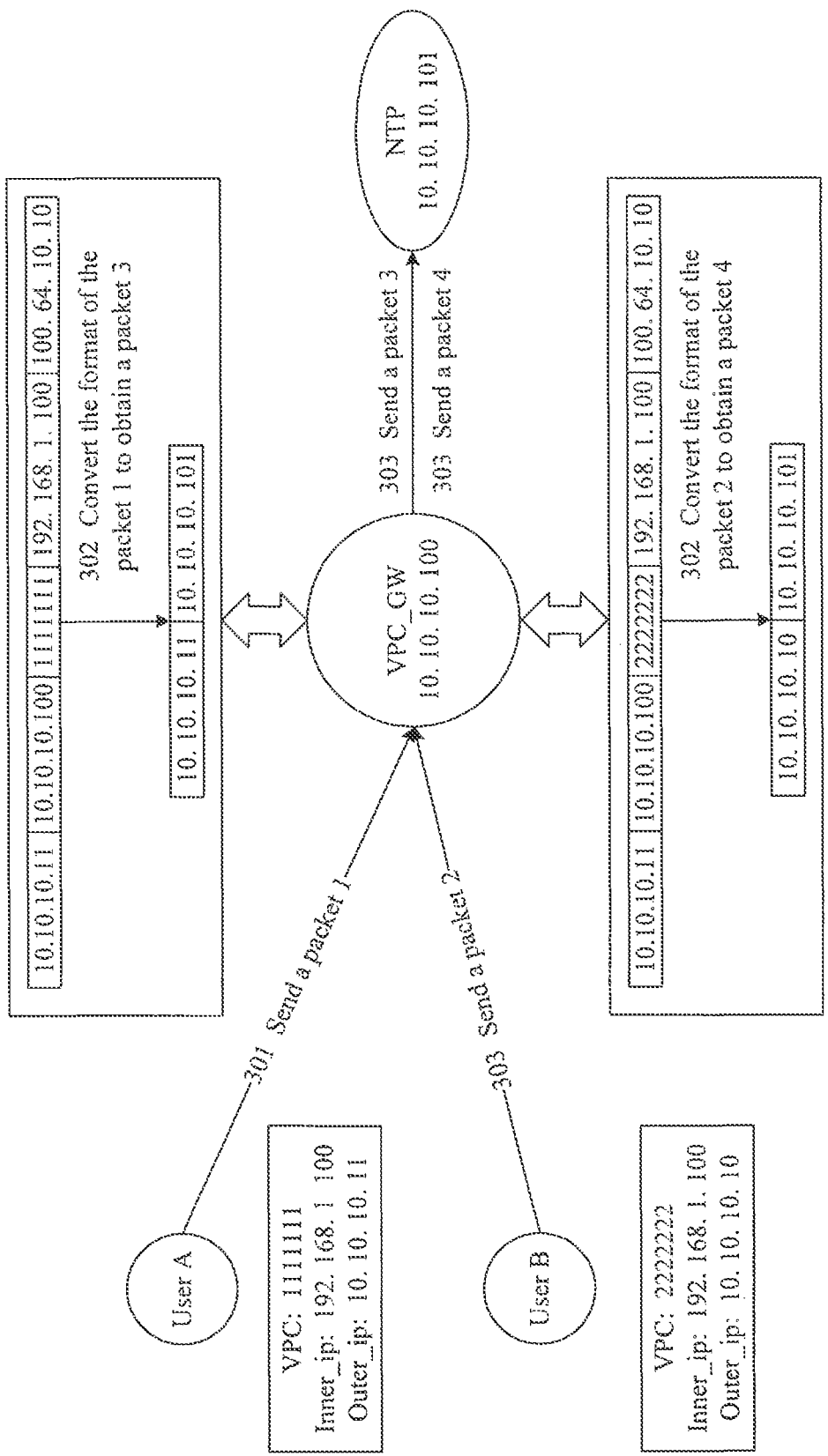
FIG. 12 is a flowchart of an exemplary method for performing data transmission in a scenario according to some embodiments of the present disclosure.

FIG. 12 is a flowchart of an exemplary method for performing data transmission in a scenario according to some embodiments of the present disclosure. In the example shown in FIG. 12, there are two different VPCs both supporting the VXLAN, namely, VPC11111111 and VPC2222222. The VPC111111 has a user A, and the VPC2222222 has a user B. A source address of the user A in the VPC1111111 is 192.168.1.100, an external source address is 10.10.10.11, and a virtual network identifier is 1111111. A source address of the user A in the VPC2222222 is 192.168.1.100, an external source address is 10.10.10.10, and a virtual network identifier is 2222222. A gateway address of a gateway VPC-GW between the VPC and the private network (supporting the VLAN) is 10.10.10.100. An NTP server informs the user A and the user B about an address 100.64.10.10, and an actual address in the private network is 10.10.10.101.

The traffic flowing from the private network side to the user side in the virtual private network can be illustrated with reference to FIG. 12. The procedure can include the following steps.

In step 301, the user A sends a packet 1 to the VPC-GW, and the user B sends a packet 2 to the VPC-GW. A header of the packet 1 carries an external source address 10.10.10.11, an external destination address 10.10.10.100, a virtual network identifier 1111111, an internal source address 192.168.1.100, and an internal destination address 100.64.10.10. A header of the packet 2 carries an external source address 10.10.10.10, an external destination address 10.10.10.100, a virtual network identifier 222222, an internal source address 192.168.1.100, and an internal destination address 100.64.10.10.

In step 302, the VPC-GW converts the received packet 1 and packet 2 respectively from the VXLAN format to the VLAN format to obtain a packet 3 and a packet 4. A header of the packet 3 carries a source address 10.10.10.11 and a destination address 10.10.10.101. A header of the packet 4 carries a source address 10.10.10.10 and a destination address 10.10.10.101.

In step 303, the VPC-GW sends the packet 3 and the packet 4 to the NTP server according to routing information recorded in the routing table.

Figure 13:
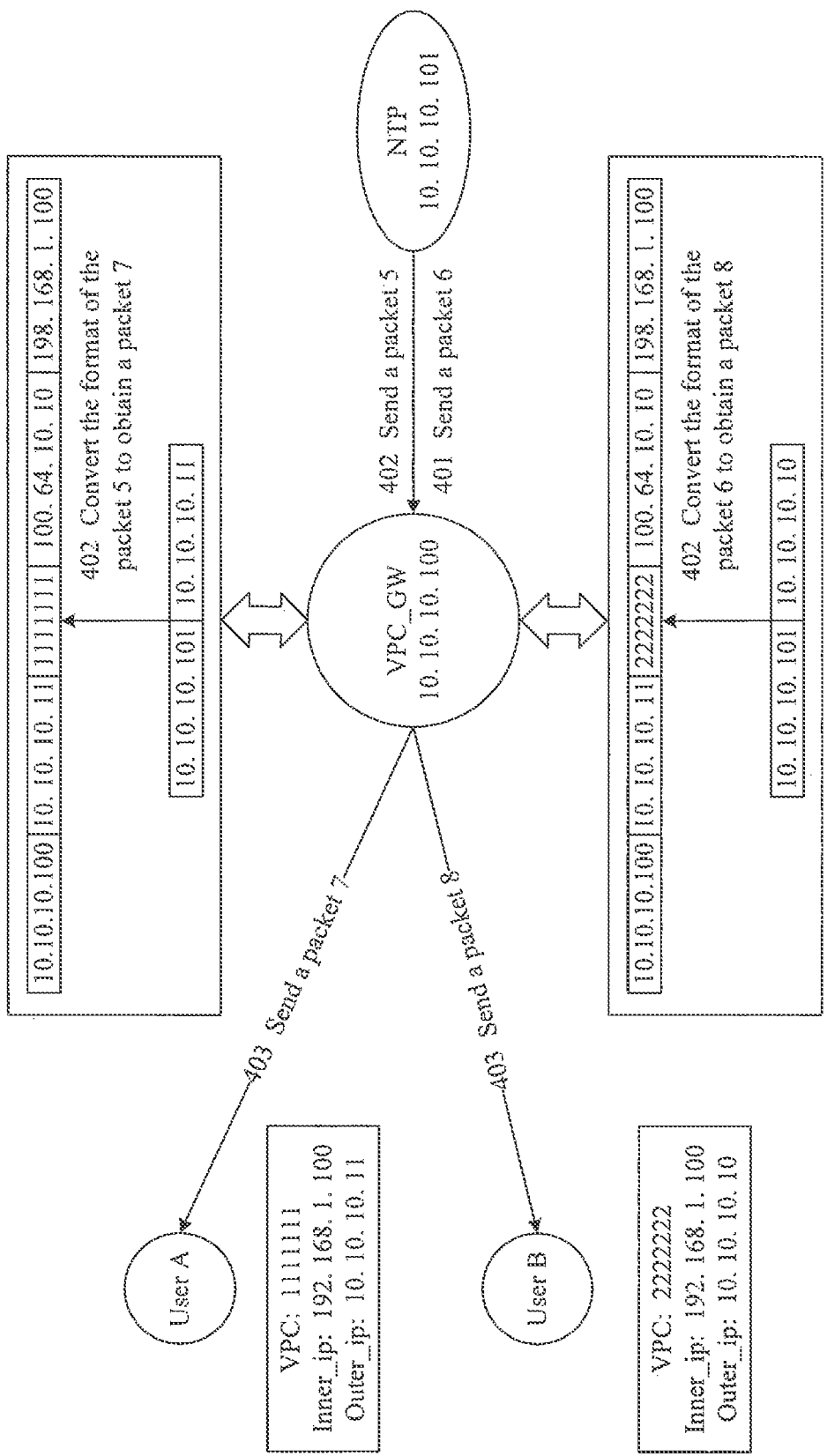
FIG. 13 is a flowchart of an exemplary method for performing data transmission in a scenario according to some embodiments of the present disclosure.

FIG. 13 is a flowchart of an exemplary method for performing data transmission in a scenario according to some embodiments of the present disclosure. The traffic flowing from the user side in the virtual private network to the private network side can be illustrated with reference to FIG. 13. The procedure can include the following steps.

In step 401, the NTP server returns to the VPC-GW a packet 5 that replies to the packet 3 and a packet 6 that replies to the packet 4. A header of the packet 5 carries a source address 10.10.10.101 and a destination address 10.10.10.11. A header of the packet 6 carries a source address 10.10.10.101 and a destination address 10.10.10.10.

In step 402, after receiving the packet 5 and the packet 6, the VPC-GW converts the received packet 5 and packet 6 respectively from the VLAN format to the VXLAN format to obtain a packet 7 and a packet 8. A header of the packet 7 carries an external source address 10.10.10.100, an external destination address 10.10.10.11, a virtual network identifier 1111111, an internal source address 100.64.10.10, and an internal destination address 192.168.1.100. A header of the packet 8 carries an external source address 10.10.10.100, an external destination address 10.10.10.10, a virtual network identifier 222222, an internal source address 100.64.10.10, and an internal destination address 192.168.1.100.

In step 403, the VPC-GW sends the packet 7 to the user A and sends the packet 8 to the user B, respectively.

Setting of network addresses of various network devices, selection of packet formats supported by various networks, and results before and after format conversion are not limited in the foregoing examples.

Figure 14:
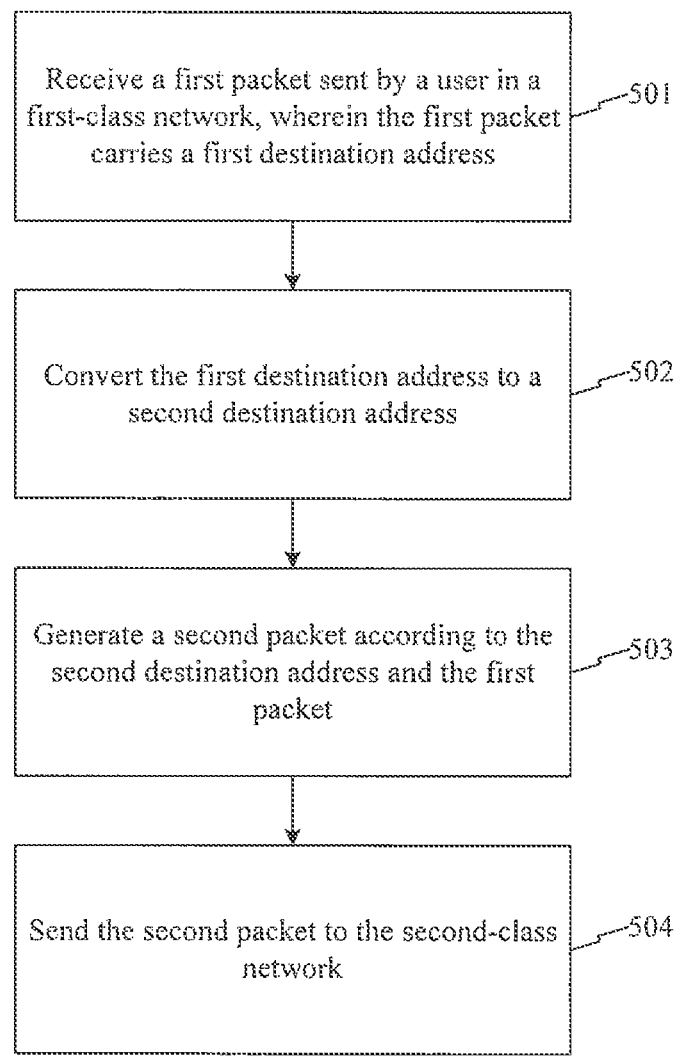
FIG. 14 is a diagram of an exemplary data transmission method according to some embodiments of the present disclosure.

The embodiments of the disclosure are not limited to the networking architecture formed by the virtual private network, the private network and the public network, can be applied to a network architecture formed by many other types of networks. Therefore, some embodiments of the present disclosure provide an exemplary data transmission method, which is applied to a packet forwarding device between two networks, as shown in FIG. 14. The method can include the following steps. In step 501, a first packet sent by a user in a first-class network is received, wherein a first destination address carried by the first packet is a designated address in a second-class network, and the designated address neither belongs to an address range that has been configured for the first-class network nor belongs to an address range that has been configured for a third-class network.

In step 502, the first destination address is converted to obtain a second destination address.

In step 503, a second packet is generated according to the second destination address and the first packet.

In step 504, the second packet is sent to the second-class network.

Figure 15:
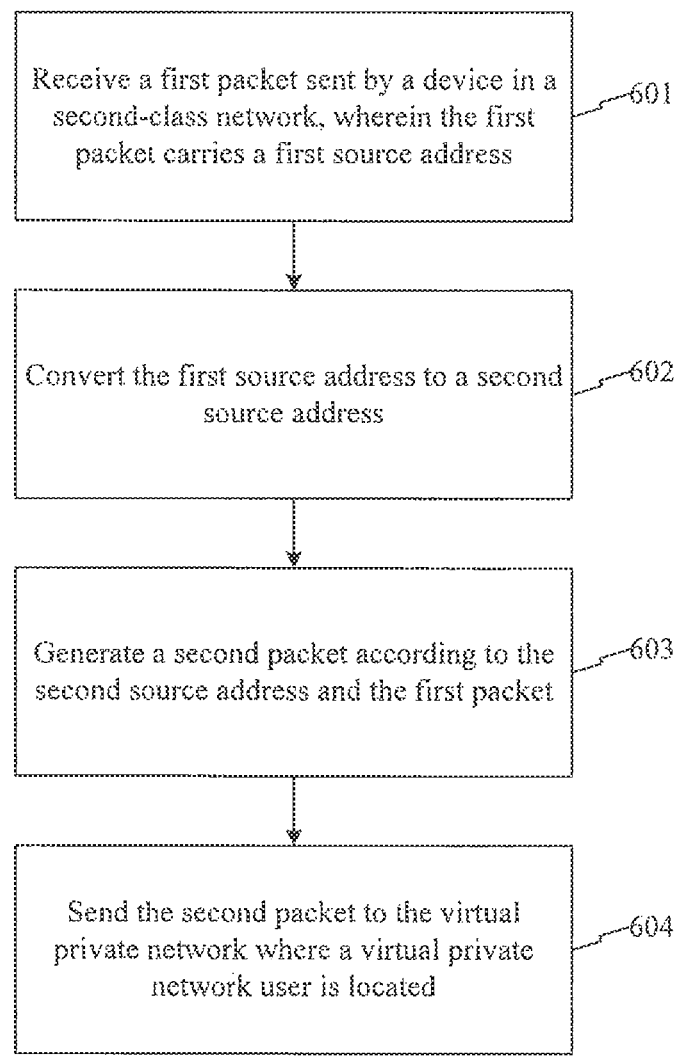
FIG. 15 is another diagram of an exemplary data transmission method according to some embodiments of the present disclosure.

FIG. 15 is another diagram of an exemplary data transmission method according to some embodiments of the present disclosure. As shown in FIG. 15, the method can include the following steps.

In step 601, a first packet sent by a device in the second-class network is received, wherein the first packet carries a first source address.

In step 602, the first source address is converted to a second source address, wherein the second source address is a designated address in the second-class network, and the designated address does not belong to an address range that has been configured for a virtual private network where a virtual private network user is located.

In step 603, a second packet is generated according to the second source address and the first packet.

In step 604, the second packet is sent to the virtual private network where the virtual private network user is located.

Figure 16:
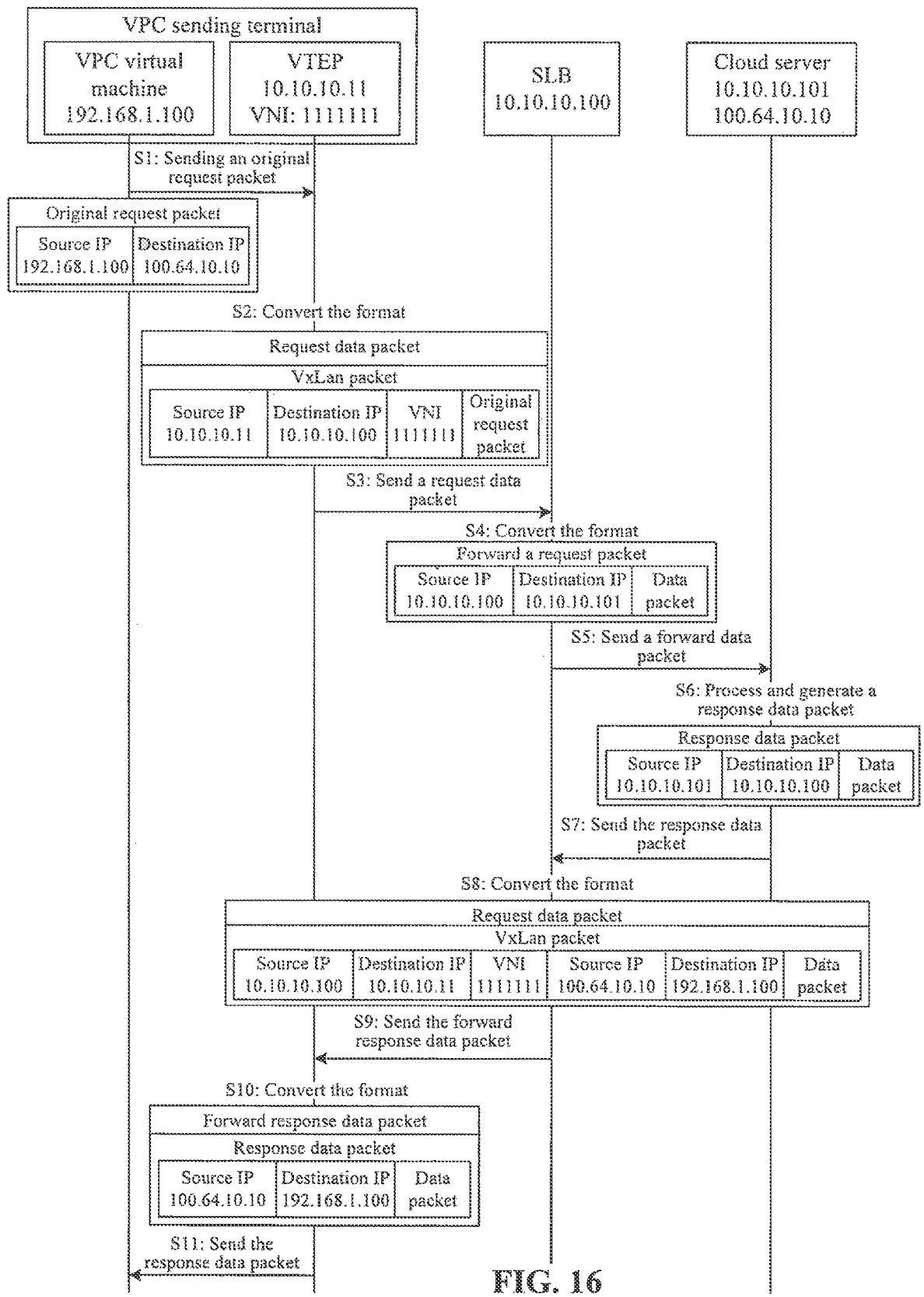
FIG. 16 is a flowchart of an exemplary data transmission system according to some embodiments of the present disclosure.

In addition, some embodiments of the present disclosure further provide a method procedure using a VPC sending terminal, a Server Load Balancer (SLB), and a cloud server as interaction devices, as shown in FIG. 16. The VPC sending terminal includes: a VPC virtual machine and a VLAN Tunneling End Point (VTEP). The interactions can be among any number of VPC sending terminals, any number of SLBs, and any number of cloud servers.

The VPC is a private cloud space rented by a user in a public cloud. A private server space of the user is formed in the cloud by using virtualization technologies, which carries application services of the user, and is referred to as an application server or VPC virtualization.

The VPC virtual machine guarantees security of user data in respective rented application servers by using network isolation technologies. The user can deploy application services associated with the business onto virtual machines of respective application servers, and various VPC virtual machines in the cloud process business procedures. For example, it is unnecessary for a bank system to own a database and a business processing server. A transfer business is deployed in a VPC virtual machine in the cloud. The VPC virtual machine bearing the transfer business and a cloud server implement the transfer business jointly. Like a physical machine, each VPC virtual machine is also provided with a respective IP address. In the embodiments of the present disclosure, the IP of the VPC virtual machine is 192.168.1.100.

VTEP is an abbreviation of VLAN Tunneling End Point, which is a device that is implemented by hardware or software. The device supports VxLan and can be used as an intermediate layer to encapsulate and decapsulate a VxLan packet. For a VPC sending terminal, the VTEP encapsulates a VxLan header according to the virtual network identifier (VNI) and the IP, so as to encapsulate an original request packet sent by the application server. Likewise, when the VPC sending terminal receives a data packet returned by the cloud server, the data packet also needs to be decapsulated by the VTEP to obtain the VxLan packet, then acquire the VNI and a destination IP address of an inner-layer packet and determine a destination VPC virtual machine to send the inner-layer packet to the destination VPC virtual machine. In some embodiments, the IP address of the VTEP is 10.10.10.11, and the corresponding virtual network identifier is 1111111.

The SLB is a server load balancer, which can forward a request to achieve load balancing of various servers and cross-network access. The SLB can be either a hardware or a virtual apparatus on a hardware, and the SLB can be either communicated with a cloud server network or a VTEP. Generally, after the SLB is selected, a private network internal IP of the SLB corresponding to a VPC user is pre-configured for the SLB, and the private network internal IP of the SLB is used to enable interaction between the SLB and the application server in the VPC network, such that the interaction between the SLB and the application server is similar to communication in the same private network. The SLB further needs to store an association between an actual network address of the cloud server and the server address that is configured for the VPC user, such that the SLB can forward data communication between the VPC user and the cloud server. The IP address of the SLB is 10.10.10.100.

The cloud server is a device that provides various cloud services for users. Various user requests forwarded by the SLB can be processed. An actual IP address of the cloud server is 10.10.10.101, and the IP address configured for the VPC user is 100.64.10.10.

The procedure can include the following steps.

In step s1, the VPC virtual machine sends an original request packet to request a service from the cloud server. A source IP in the original request packet is the IP address (192.168.1.100) of the VPC virtual machine in the VPC sending terminal, and a destination IP is the private network internal IP address (100.64.10.10) of the cloud server pre-configured for the VPC user.

In step s2, the VTEP encapsulates the original request packet based on the VxLan protocol to form a VxLan packet. A header of the VxLan data packet carries an external source address (the private network internal IP address 10.10.10.11 of the VTEP), an external destination address (the private network internal IP address 10.10.10.100 of the SLB), a virtual network identifier 1111111, an internal source address (the IP address 192.168.1.100 of the VPC virtual machine in the VPC network), and an internal destination address (the cloud server IP address 100.64.10.10 configured for the user).

In step s3, the VTEP sends the request data packet to the SLB.

In step s4, the SLB receives the request data packet and then parses the request data packet. The request data packet is converted from the VxLAN format into the VLAN format. In this step, the SLB parses the request data packet to obtain the original request packet, modifies a source IP in the original request packet into the IP address (10.10.10.100) of the SLB, modifies a destination IP address into the IP (10.10.10.101) of the cloud server, forming a forward request packet by keeping the data packet content in the original request packet unchanged, and sends the forward request packet to the cloud server.

In step s5, the SLB sends the forward request packet to the cloud server.

In step s6, after acquiring the request packet forwarded by the SLB, the cloud server correspondingly processes data in the data packet in the request packet and generates an original response packet.

In step s7, the original response packet is sent to the SLB according to the private network internal IP address of the SLB.

In step s8, after receiving the original response packet sent by the cloud server, the SLB parses the original response packet. The response data packet is converted from the VLAN format into the VxLAN format. In this step, the SLB modifies address content in the original response packet, modifies a source IP in the original response packet into the IP (100.64.10.10) of the cloud server, modifies a destination IP into the IP address (192.168.1.100) of the VPC virtual machine, and forms a forward response packet by keeping the data packet in the original response packet unchanged. Then, the forward response packet and information such as the virtual network identifier VNI (1111111) are encapsulated in a VxLan packet. A header of the VxLan data packet carries an external source address (the private network internal IP address 10.10.10.100 of the SLB), an external destination address (the private network internal IP address 10.10.10.11 of the VTEP), a virtual network identifier 1111111, an internal source address (the cloud server IP address 100.64.10.10 configured for the user), and an internal destination address (the IP address 192.168.1.100 of the VPC virtual machine in the VPC network).

In step s9, the SLB sends the forward response data packet to the VTEP.

In step s10, after receiving the encapsulated forward response data packet, the VTEP decapsulates the encapsulated forward response data packet, and determines a VPC virtual machine according to the VNI and the destination IP that are obtained after the decapsulation.

In step s11, the VTEP sends the response data packet obtained by the decapsulation to the VPC virtual machine to implement the whole interaction process between the application server and the cloud server.

Figure 17:
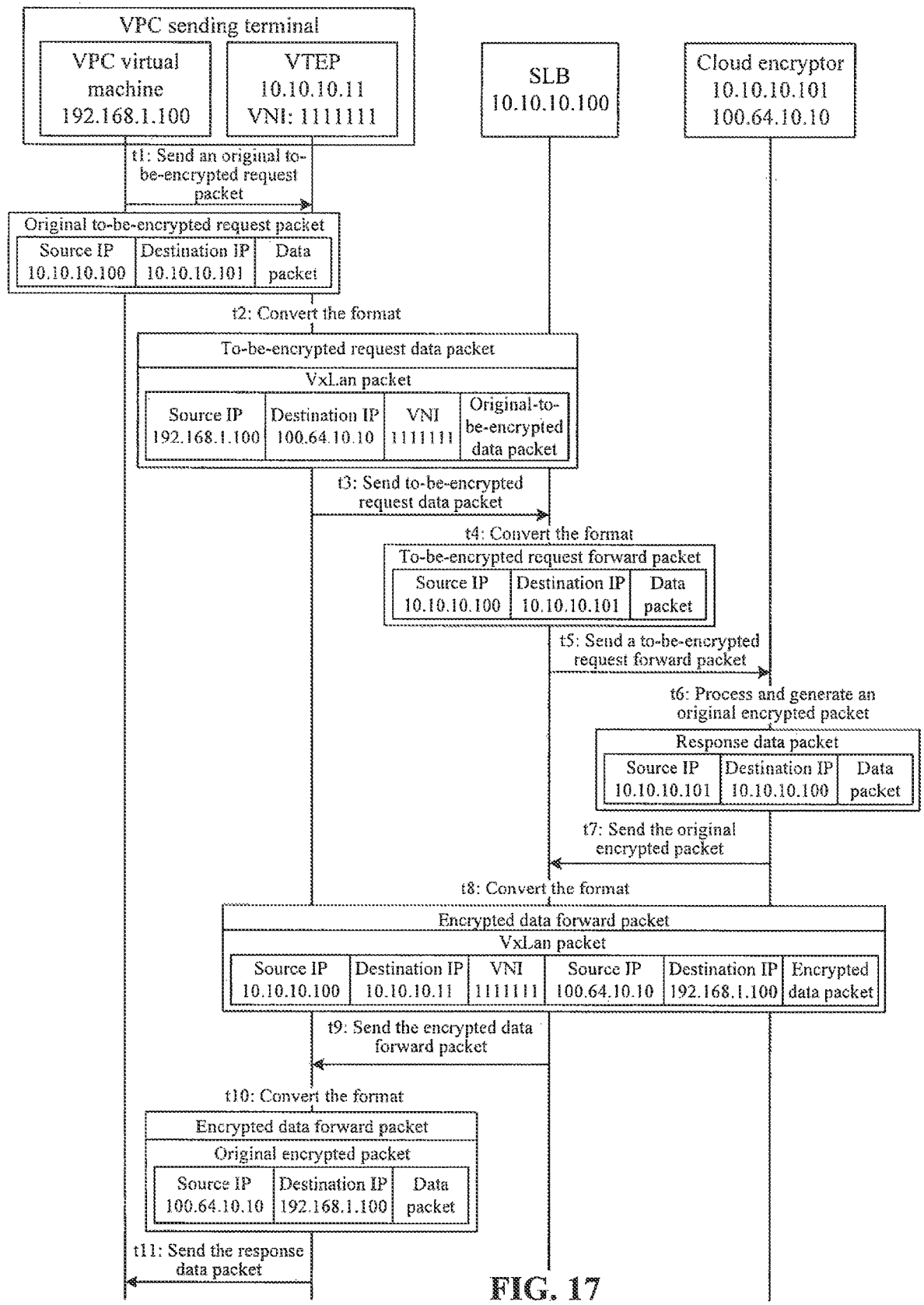
FIG. 17 is a flowchart of an exemplary data transmission system implemented based on an encryption service according to some embodiments of the present disclosure.

In addition, in the process of providing an encryption service for the VPC user, some embodiments of the present disclosure further provide a method procedure implemented by using a VPC sending terminal, an SLB, and a cloud encryptor as interaction devices, as shown in FIG. 17. The VPC sending terminal includes: a VPC virtual machine and a VTEP. The interaction can be applied among any number of VPC sending terminals, any number of SLBs, and any number of cloud encryptors.

In some embodiments, an IP address of the VPC virtual machine is 192.168.1.100. An IP address of the TEP is 10.10.10.11, and a corresponding virtual network identifier is 1111111. The IP address of the SLB is 10.10.10.100. An actual IP address of the cloud encryptor is 10.10.10.101, and the IP address configured for the VPC user is 100.64.10.10. The procedure can include the following steps.

In step t1, the VPC virtual machine sends an original to-be-encrypted request packet to request an encryption service from the cloud encryptor. A source IP in the original to-be-encrypted request packet is the IP address (192.168.1.100) of the VPC virtual machine in the VPC sending terminal, and a destination IP is the private network internal IP address (100.64.10.10) of the cloud encryptor pre-configured for the VPC user.

In step t2, the VTEP encapsulates the original to-be-encrypted request packet based on the Vxlan protocol to form a Vxlan packet. A header of the Vxlan data packet carries an external source address (the private network internal IP address 10.10.10.11 of the VTEP), an external destination address (the private network internal IP address 10.10.10.100 of the SLB), a virtual network identifier 1111111, an internal source address (the IP address 192.168.1.100 of the VPC virtual machine in the VPC network), and an internal destination address (the cloud encryptor IP address 100.64.10.10 configured for the user).

In step t3, the VTEP sends the to-be-encrypted request data packet to the SLB.

In step t4, the SLB receives the to-be-encrypted request data packet and then parses the to-be-encrypted request data packet. The to-be-encrypted request data packet is converted from the VxLAN format into the VLAN format. In this step, the SLB parses the to-be-encrypted request data packet to obtain the original to-be-encrypted request packet, modifies a source IP in the original to-be-encrypted request packet into the IP address (10.10.10.100) of the SLB, modifies a destination IP address into the IP (10.10.10.101) of the cloud encryptor, forming a to-be-encrypted request forward packet by keeping the data packet content in the original to-be-encrypted request packet unchanged, and sends the to-be-encrypted request forward packet to the cloud encryptor.

In step t5, the SLB sends the to-be-encrypted request forward packet to the cloud encryptor.

In step t6, after acquiring the to-be-encrypted request forward packet forwarded by the SLB, the cloud encryptor correspondingly encrypts data in the data packet in the to-be-encrypted request forward packet and generates an original encrypted packet.

In step t7, the original encrypted packet is sent to the SLB according to the private network internal IP address of the SLB.

In step t8, after receiving the original encrypted packet sent by the cloud encryptor, the SLB parses the original encrypted packet. The original encrypted packet is converted from the VLAN format into the VxLAN format. In this step, the SLB modifies address content in the original encrypted packet, modifies a source IP in the original encrypted packet into the IP (100.64.10.10) of the cloud encryptor, modifies a destination IP into the IP address (192.168.1.100) of the VPC virtual machine, and forms a forward encrypted packet by keeping the data packet in the original encrypted packet unchanged. Then, the forward encrypted packet and information such as the virtual network identifier VNI (1111111) are encapsulated to obtain a VxLan packet. A header of the Vxlan data packet carries an external source address (the private network internal IP address 10.10.10.100 of the SLB), an external destination address (the private network internal IP address 10.10.10.11 of the VTEP), a virtual network identifier 1111111, an internal source address (the cloud encryptor IP address 100.64.10.10 configured for the user), and an internal destination address (the IP address 192.168.1.100 of the VPC virtual machine in the VPC network).

In step t9, the SLB sends the encrypted data forward packet to the VTEP.

In step t10, after receiving the encapsulated encrypted data forward packet, the VTEP decapsulates the encapsulated encrypted data forward packet, and determines a VPC virtual machine according to the VNI and the destination IP that are obtained after the decapsulation.

In step t11, the VTEP sends the encrypted data packet obtained by the decapsulation to the VPC virtual machine to implement the whole interaction process between the application server and the cloud encryptor.

The foregoing t1 to t11 are merely an example of the encryption process.

Figure 18:
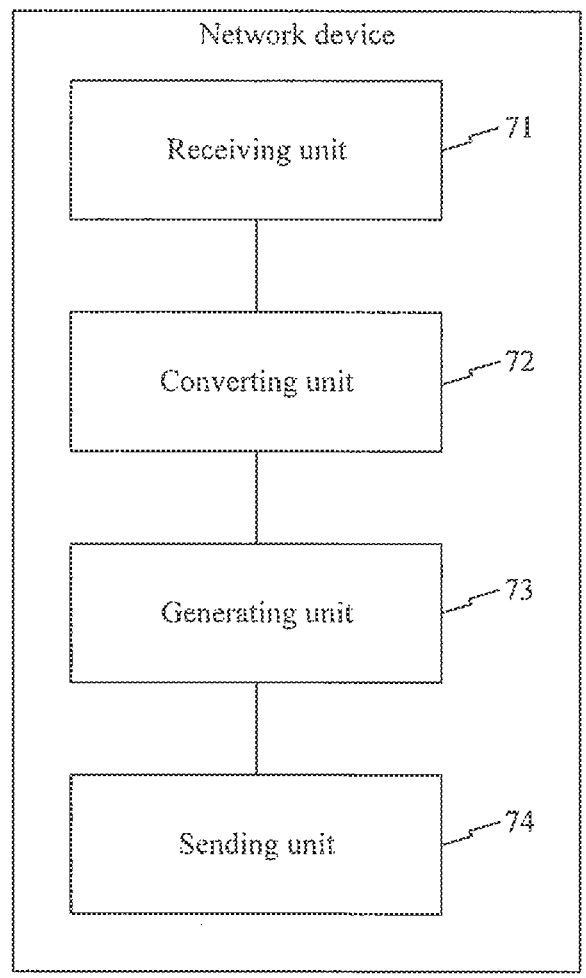
FIG. 18 is a schematic diagram of an exemplary network device for data transmission according to some embodiments of the present disclosure.

FIG. 18 is a schematic diagram of an exemplary network device for data transmission according to some embodiments of the present disclosure. As shown in FIG. 18, the network device includes the following units.

A receiving unit 71 has circuitry to receive a first packet sent by a virtual private network user, wherein a first destination address carried by the first packet is a designated address, and the designated address does not belong to an address range that has been configured for a virtual private network where the virtual private network user is located.

A converting unit 72 has circuitry to convert the first destination address to a second destination address.

A generating unit 73 has circuitry to generate a second packet according to the second destination address and the first packet.

A sending unit 74 has circuitry to send the second packet to the exterior of the virtual private network where the virtual private network user is located.

In some embodiments, the converting unit 72 has circuitry to parse the first packet to obtain an internal destination address and a virtual network identifier, determine the first destination address according to the internal destination address, and determine network identifier information of the virtual private network where the virtual private network user is located, search a pre-configured address mapping table for a destination address to which the first destination address and the network identifier information correspond jointly and when a destination address to which the first destination address and the network identifier information correspond jointly is found, determine the found destination address as the second destination address.

In some embodiments, the generating unit 73 has circuitry to convert the first format to the second format when the first packet abides by the first format, and encapsulate packet information carried by the first packet and the second destination address according to the second format to obtain the second packet.

In some embodiments, the generating unit 73 has circuitry to replace first header information abiding by the first format in the first packet with second header information abiding by the second format, wherein the first header information includes at least an internal source address, an internal destination address, a virtual network identifier, an external source address, and an external destination address, and the second header information includes at least a source address and a destination address; and encapsulate the second header information and the packet information to obtain the second packet, wherein a source address carried in the second header information is the address of the network device, and a carried destination address is the second destination address.

In some embodiments, the sending unit 74 has circuitry to determine a next-hop device according to the second destination address and a routing table, wherein the next-hop device is located outside the virtual private network where the virtual private network user is located; and send the second packet to the next-hop device.

In some embodiments, the designated address does not belong to an address range that has been configured for a designated network.

In some embodiments, the designated address belongs to an address range from 100.64.0.0 to 100.64.0.10.

In some embodiments, the virtual private network is a VPC network.

In some embodiments, the first format is a VXLAN format, and the second format is a VLAN format.

Figure 19:
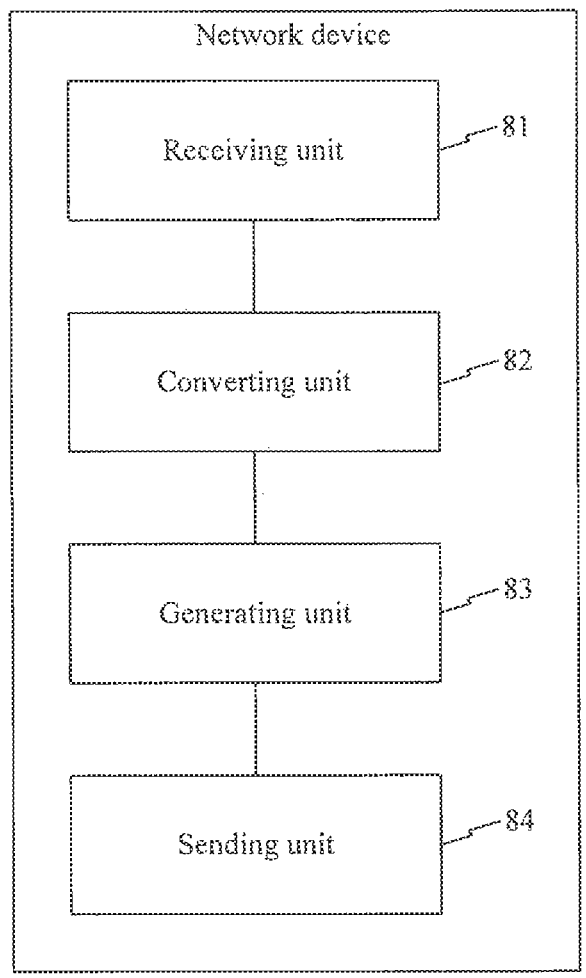
FIG. 19 is a schematic diagram an exemplary network device for data transmission according to some embodiments of the present disclosure.

FIG. 19 is a schematic diagram an exemplary network device for data transmission according to some embodiments of the present disclosure. The network device can include the following units.

A receiving unit 81 configured to receive a first packet sent by a user in a first-class network, wherein a first destination address carried by the first packet is a designated address in a second-class network, and the designated address neither belongs to an address range that has been configured for the first-class network nor belongs to an address range that has been configured for a third-class network.

A converting unit 82 configured to convert the first destination address to obtain a second destination address.

A generating unit 83 configured to generate a second packet according to the second destination address and the first packet.

A sending unit 84 configured to send the second packet to the second-class network.

Figure 20:
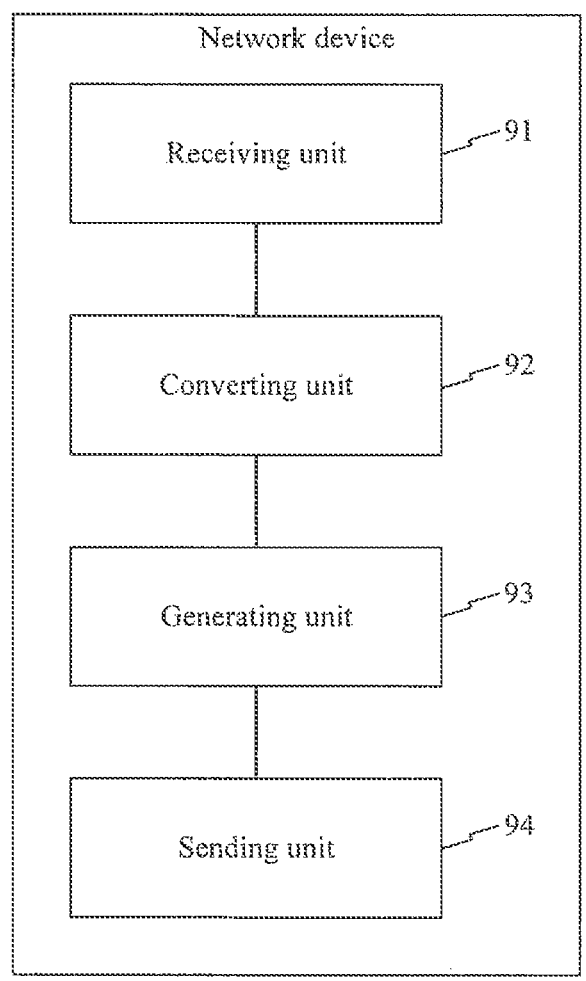
FIG. 20 is a schematic diagram of an exemplary network device for data transmission according to some embodiments of the present disclosure.

FIG. 20 is a schematic diagram of an exemplary network device for data transmission according to some embodiments of the present disclosure. The network device can include the following units.

A receiving unit 91 configured to receive a first packet sent by a second network device, wherein the first packet carries a first source address.

A converting unit 92 configured to convert the first source address to obtain a second source address, wherein the second source address is a designated address, and the designated address does not belong to an address range that has been configured for a virtual private network where a virtual private network user is located.

A generating unit 93 configured to generate a second packet according to the second source address and the first packet.

A sending unit 94 configured to send the second packet to the interior of the virtual private network where the virtual private network user is located.

In some embodiments, the converting unit 92 is specifically configured to parse the first packet to obtain the first source address, search a pre-configured address mapping table for a source address to which the first source address corresponds; and when a source address to which the first source address corresponds is found, determine the found source address as the second source address.

In some embodiments, the generating unit 93 is specifically configured to convert the first format to the second format when the first packet abides by the first format, and encapsulate packet information carried by the first packet and the second source address according to the second format to obtain the second packet.

In some embodiments, the generating unit 93 is further specifically configured to replace first header information abiding by the first format in the first packet with second header information abiding by the second format, wherein the first header information includes at least a source address and a destination address, and the second header information includes at least an internal source address, an internal destination address, a virtual network identifier, an external source address, and an external destination address; and encapsulate the second header information and the packet information to obtain the second packet, wherein a source address carried in the second header information is the address of the network device, and a carried destination address is the second destination address.

In some embodiments, the designated address does not belong to an address range that has been configured for a designated network.

In some embodiments, the designated address belongs to an address range from 100.64.0.0 to 100.64.0.10.

In some embodiments, the virtual private network is a VPC network.

In some embodiments, the first format is a VLAN format, and the second format is a VXLAN format.

Figure 21:
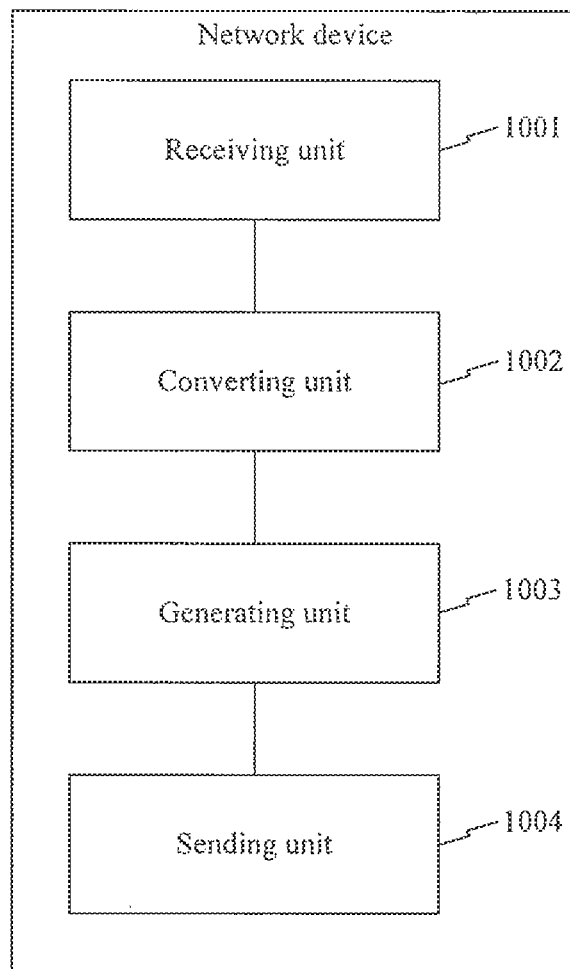
FIG. 21 is a schematic diagram of an exemplary network device for data transmission according to some embodiments of the present disclosure.

FIG. 21 is a schematic diagram of an exemplary network device for data transmission according to some embodiments of the present disclosure. The network device can include the following units.

A receiving unit 1001 configured to receive a first packet sent by a device in a second-class network, wherein the first packet carries a first source address.

A converting unit 1002 configured to convert the first destination address to obtain a second source address, wherein the second source address is a designated address in the second-class network, and the designated address does not belong to an address range that has been configured for a virtual private network where a virtual private network user is located.

A generating unit 1003 configured to generate a second packet according to the second destination address and the first packet.

A sending unit 1004 configured to send the second packet to the interior of the virtual private network where the virtual private network user is located.

The network device for data transmission provided in the embodiment of the present disclosure enables a user in a virtual private network to acquire various services provided by corresponding servers only by using a private network that can provide a business service, such that the user in the virtual private network does not need to acquire services by accessing other networks than the private network, thereby saving traffic for the user.

Figure 22:
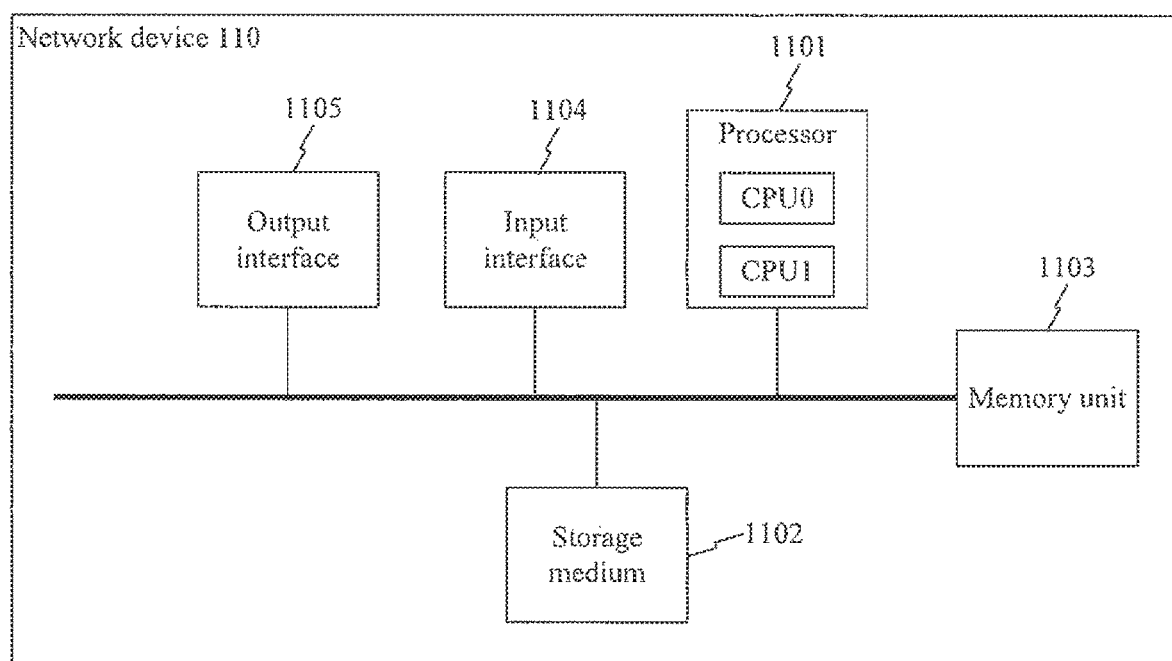
FIG. 22 is a schematic diagram of an exemplary network device for data transmission according to some embodiments of the present disclosure.

FIG. 22 is a schematic diagram of an exemplary network device for data transmission according to some embodiments of the present disclosure. The exemplary network device (e.g. network device 110) can include a processor 1101 connected to one or more data storage tools. The data storage tool can include a storage medium 1102 and a memory unit 1103. The network device 110 can further include an input interface 1104 and an output interface 1105 and is configured to communicate with another apparatus or system. A program code that is executed by a CPU of the processor 1101 can be stored in the memory unit 1102 or the storage medium 1103.

The processor 1101 in the network device 110 calls the program code to perform the following steps.

The receiving unit 1101 receives, through the input interface 1104, a first packet sent by a virtual private network user, wherein a first destination address carried by the first packet is a designated address, and the designated address does not belong to an address range that has been configured for a virtual private network where the virtual private network user is located; convert the first destination address to obtain a second destination address; generate a second packet according to the second destination address and the first packet; and send, through the output interface 1105, the second packet to the exterior of the virtual private network where the virtual private network user is located.

In some embodiments, the processor 1101 is further configured to parse the first packet to obtain an internal destination address and a virtual network identifier, determine the first destination address according to the internal destination address, and determine network identifier information of the virtual private network where the virtual private network user is located, search a pre-configured address mapping table for a destination address to which the first destination address and the network identifier information correspond jointly, and when a destination address to which the first destination address and the network identifier information correspond jointly is found, determine the found destination address as the second destination address.

In some embodiments, the processor 1101 is further configured to convert the first format to the second format when the first packet meets the first format, and encapsulate packet information carried by the first packet and the second destination address according to the second format to obtain the second packet.

In some embodiments, the processor 1101 is further configured to replace first header information meeting the first format in the first packet with second header information meeting the second format, wherein the first header information includes at least an internal source address, an internal destination address, a virtual network identifier, an external source address, and an external destination address, and the second header information includes at least a source address and a destination address, and encapsulate the second header information and the packet information to obtain the second packet, wherein a source address carried in the second header information is the address of the network device, and a carried destination address is the second destination address.

In some embodiments, the processor 1101 is further configured to determine a next-hop device according to the second destination address and a routing table, wherein the next-hop device is located outside the virtual private network where the virtual private network user is located; and send the second packet to the next-hop device through the output interface 1105.

In some embodiments, the designated address does not belong to an address range that has been configured for a designated network.

In some embodiments, the designated address belongs to an address range from 100.64.0.0 to 100.64.0.10.

In some embodiments, the virtual private network is a VPC network.

In some embodiments, the first format is a VXLAN format, and the second format is a VLAN format.

In some embodiments, the processor 1101 is further configured to receive, through the input interface 1104, a first packet sent by a user in a first-class network, wherein a first destination address carried by the first packet is a designated address in a second-class network, and the designated address neither belongs to an address range that has been configured for the first-class network nor belongs to an address range that has been configured for a third-class network; convert the first destination address to obtain a second destination address; generate a second packet according to the second destination address and the first packet; and send the second packet to the second-class network through the output interface 1105.

As shown in FIG. 22, the processor 1101 is further configured to receive, through the input interface 1104, a first packet sent by a network device, wherein the first packet carries the first source address, and convert the first source address to obtain a second source address, wherein the second source address is a designated address, and the designated address does not belong to an address range that has been configured for a virtual private network where a virtual private network user is located, generate a second packet according to the second source address and the first packet, and send, through the output interface 1105, the second packet to the interior of the virtual private network where the virtual private network user is located.

In some embodiments, the processor 1101 is further configured to parse the first packet to obtain the first source address, search a pre-configured address mapping table for a source address to which the first source address corresponds, and when a source address to which the first source address corresponds is found, determine the found source address as the second source address.

In some embodiments, the processor 1101 is further configured to convert the first format to the second format when the first packet meets the first format, and encapsulate packet information carried by the first packet and the second source address according to the second format to obtain the second packet.

In some embodiments, the processor 1101 is further configured to replace first header information meeting the first format in the first packet with second header information meeting the second format, wherein the first header information includes at least a source address and a destination address, and the second header information includes at least an internal source address, an internal destination address, a virtual network identifier, an external source address, and an external destination address; and encapsulate the second header information and the packet information to obtain the second packet, wherein a source address carried in the second header information is the address of the network device, and a carried destination address is the second destination address.

In some embodiments, the designated address does not belong to an address range that has been configured for a designated network.

In some embodiments, the designated address belongs to an address range from 100.64.0.0 to 100.64.0.10.

In some embodiments, the virtual private network is a VPC network.

In some embodiments, the first format is a VLAN format, and the second format is a VXLAN format.

In some embodiments, the processor 1101 is further configured to receive, through the input interface 1104, a first packet sent by a device in a second-class network, wherein the first packet carries a first source address; and convert the first destination address to obtain a second source address, wherein the second source address is a designated address in the second-class network, and the designated address does not belong to an address range that has been configured for a virtual private network where a virtual private network user is located; generate a second packet according to the second destination address and the first packet; and send, through the output interface 1105, the second packet to the interior of the virtual private network where the virtual private network user is located.

The network device for data transmission provided in the embodiments of the disclosure enables a user in a virtual private network to acquire various services provided by corresponding servers only by using a private network that can provide a business service, such that the user in the virtual private network does not need to acquire services by accessing other networks than the private network, thereby saving traffic for the user.

The processor is a control center of the foregoing device (the device is the foregoing server or the foregoing client terminal), provides a processing apparatus configured to execute an instruction to perform an interruption operation, and provides a timing function and many other functions. In some embodiments, the processor includes one or more central processing units (CPUs), e.g., a CPU 0 and a CPU 1 shown in FIG. 22. The device includes one or more processors. The processor can be a single-core (single-CPU) processor or a multi-core (multi-CPU) processor. Unless otherwise specified, a component described as being configured to perform a task, such as the processor or the memory, can be implemented as a universal component temporarily configured to perform a task in a given period of time, or implemented as a specific component that is specifically manufactured to perform the task. The term "processor" used here refers to one or more apparatuses, circuits and/or processor units that are configured to process data, e.g., computer program instructions.

A program code that is executed by a CPU of the processor can be stored in a memory unit or a storage medium. In some embodiments, the program code stored in the storage medium can be copied into the memory unit to be executed by the CPU of the processor. The processor can execute at least one kernel (such as LINUX™, UNIX™, WINDOWS™, ANDROID™, and IOS™). It is well known that the kernel is configured to control operations of the foregoing device by controlling execution of other programs or processes, controlling communication with a peripheral apparatus and controlling use of computer device resources. When the foregoing units are implemented in a form of a software functional units, the integrated units may be stored in a computer-readable storage medium such as memory unit 1103 of FIG. 22. The software functional units can be stored in a storage medium and includes several instructions for instructing a computer device or a processor to perform some or all of the steps of the method embodiments of the present disclosure. The computer device may be a personal computer, a server, or a network device. The foregoing storage medium can include any medium that can store program codes, such as a USB flash drive, a mobile hard disk, a Read-Only Memory (ROM), a Random Access Memory (RAM), a magnetic disk, or an optical disc. The storage medium can be a non-transitory computer readable medium. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM any other memory chip or cartridge, and networked versions of the same.

Based on the several embodiments provided in the present disclosure, it should be appreciated that the disclosed technical contents may be implemented in another manner. The described apparatus, system, and method embodiments are only exemplary. For example, division of units or modules are merely exemplary division based on the logical functions. Division in another manner may exist in actual implementation. Further, a plurality of units or components may be combined or integrated into another system. Some features or components may be omitted or modified in some embodiments. In addition, the mutual coupling or direct coupling or communication connections displayed or discussed may be implemented by using some interfaces. The indirect coupling or communication connections between the units or modules may be implemented electrically or in another form.

Further, the units described as separate parts may or may not be physically separate. Parts displayed as units may or may not be physical units. They may be located in a same location or may be distributed on a plurality of network units. Some or all of the units may be selected according to actual needs to achieve the objectives of the solutions of the embodiments. In addition, functional units in the embodiments of the present disclosure may be integrated into one processing unit. Each of the units may exist alone physically, or two or more units can be integrated into one unit. The integrated unit may be implemented in a form of hardware or may be implemented in a form of a software functional unit.

It is appreciated that the above descriptions are only exemplary embodiments provided in the present disclosure. Consistent with the present disclosure, those of ordinary skill in the art may incorporate variations and modifications in actual implementation, without departing from the principles of the present disclosure. Such variations and modifications shall all fall within the protection scope of the present disclosure.

What is claimed is:

1. A data transmission method by a network device, comprising:
    receiving a first packet sent by a virtual private network user, wherein the first packet carries a first destination address that does not belong to an address range that has been configured for a virtual private network where the virtual private network user is located;
    converting the first destination address to a second destination address;
    generating a second packet according to the second destination address and the first packet, wherein the second destination address indicates a network address of a server in a private network that is accessible to the virtual private network user and the private network is outside the virtual private network; and
    sending the second packet to a device in the private network outside the virtual private network;
    wherein generating the second packet according to the second destination address and the first packet comprises:
    replacing first header information abiding by a first format in the first packet with second header information abiding by a second format, wherein the first header information comprises at least an internal source address, an internal destination address, a virtual network identity, an external source address, and an external destination address, and the second header information comprises at least a source address and a destination address.

2. The method according to claim 1, wherein converting the first destination address to the second destination address comprises:
    parsing the first packet to obtain an internal destination address and a virtual network identifier;
    determining the first destination address according to the internal destination address, and determining, according to the virtual network identifier, network identifier information of the virtual private network where the virtual private network user is located;
    searching a pre-configured address mapping table for a destination address to which the first destination address and the network identifier information correspond jointly; and
    in response to the destination address to which the first destination address and the network identifier information correspond jointly being found, setting the found destination address as the second destination address.

3. The method according to claim 1, wherein generating the second packet according to the second destination address and the first packet comprises:
    encapsulating packet information carried by the first packet and the second destination address according to the second format in the second packet.

4. The method according to claim 3,
    wherein encapsulating the packet information carried by the first packet and the second destination address according to the second format in the second packet comprises:
    encapsulating the second header information and the packet information in the second packet, wherein the source address carried in the second header information is an address of the network device, and the carried destination address is the second destination address.

5. The method according to claim 1, wherein sending the second packet to the device in the private network outside the virtual private network comprises:
    determining a next-hop device according to the second destination address and a routing table, wherein the next-hop device is located outside the virtual private network where the virtual private network user is located; and
    sending the second packet to the next-hop device.

6. The method according to claim 1, wherein the destination address is considered a designated address that does not belong to an address range that has been configured for a designated network.

7. The method according to claim 6, wherein the designated network belongs to an address range from 100.64.0.0 to 100.64.0.10.

8. The method according to claim 1, wherein the virtual private network is a Virtual Private Cloud (VPC) network.

9. The method according to claim 3, wherein the first format is a Virtual Extensible Local Area Network (VXLAN) format, and the second format is a Virtual Local Area Network (VLAN) format.

10. The method according to claim 1, wherein the first destination address and the second destination address correspond to a server.

11. The method according to claim 10, wherein the server is one of a Network Time Protocol (NTP) server or an encryption server.

12. A network device, comprising:
an interface configured to receive a first packet sent by a virtual private network user, wherein the first packet carries a first destination address that does not belong to an address range that has been configured for a virtual private network where the virtual private network user is located;
a memory storing a set of instructions; and
one or more processors configured to execute the set of instructions to cause the network device to perform:
converting the first destination address to a second destination address,
generating a second packet according to the second destination address and the first packet, wherein the second destination address indicates a network address of a server in a private network that is accessible to the virtual private network user and the private network is outside the virtual private network, and
sending the second packet to a device in the private network outside the virtual private network;
wherein generating the second packet according to the second destination address and the first packet comprises:
replacing first header information abiding by a first format in the first packet with second header information abiding by a second format, wherein the first header information comprises at least an internal source address, an internal destination address, a virtual network identity, an external source address, and an external destination address, and the second header information comprises at least a source address and a destination address.

13. The network device according to claim 12, wherein converting the first destination address to the second destination address comprises:
parsing the first packet to obtain an internal destination address and a virtual network identifier;
determining the first destination address according to the internal destination address, and determining, according to the virtual network identifier, network identifier information of the virtual private network where the virtual private network user is located;
searching a pre-configured address mapping table for a destination address to which the first destination address and the network identifier information correspond jointly; and in response to the destination address to which the first destination address and the network identifier information correspond jointly being found, setting the found destination address as the second destination address.

14. The network device according to claim 12, wherein generating the second packet according to the second destination address and the first packet comprises:
encapsulating packet information carried by the first packet and the second destination address according to the second format in the second packet.

15. The network device according to claim 12,
wherein encapsulating the packet information carried by the first packet and the second destination address according to the second format in the second packet comprises:
encapsulating the second header information and the packet information in the second packet, wherein the source address carried in the second header information is an address of the network device, and the carried destination address is the second destination address.

16. The network device according to claim 12, wherein sending the second packet to the device in the private network outside the virtual private network comprises:
determining a next-hop device according to the second destination address and a routing table, wherein the next-hop device is located outside the virtual private network where the virtual private network user is located; and
sending the second packet to the next-hop device.

17. The network device according to claim 12, wherein the first destination address is considered a designated address that does not belong to an address range that has been configured for a designated network.

18. The network device according to claim 17, wherein the designated network belongs to an address range from 100.64.0.0 to 100.64.0.10.

19. The network device according to claim 12, wherein the virtual private network is a Virtual Private Cloud (VPC) network.

20. A non-transitory computer readable medium that stores a set of instructions that is executable by at least one processor of a computer to cause the computer to perform a method for data transmission, the method comprising:
receiving a first packet sent by a virtual private network user, wherein the first packet carries a first destination address that does not belong to an address range that has been configured for a virtual private network where the virtual private network user is located;
converting the first destination address to a second destination address;
generating a second packet according to the second destination address and the first packet, wherein the second destination address indicates a network address of a server in a private network that is accessible to the virtual private network user and the private network is outside the virtual private network; and
sending the second packet to a device in the private network outside the virtual private network wherein generating the second packet according to the second destination address and the first packet comprises:
replacing first header information abiding by a first format in the first packet with second header information abiding by a second format, wherein the first header information comprises at least an internal source address, an internal destination address, a virtual network identity, an external source address, and an external destination address, and the second header information comprises at least a source address and a destination address.

\* \* \* \* \*